United States Patent
Hull et al.

(10) Patent No.: US 7,234,680 B2
(45) Date of Patent: Jun. 26, 2007

(54) COMBINATION VALVE AND REGULATOR WITH VENTED SEAT FOR USE WITH PRESSURIZED GAS CYLINDERS, PARTICULARLY OXYGEN CYLINDERS

(76) Inventors: Wendell Hull, 3220 Arrowhead Rd., Las Cruces, NM (US) 88011-4713; Barry E. Newton, 5032 Sun Shadow Pl., Las Cruces, NM (US) 88011

( * ) Notice: Subject to any disclaimer, the term of this patent is extended or adjusted under 35 U.S.C. 154(b) by 105 days.

(21) Appl. No.: 11/067,823

(22) Filed: Feb. 28, 2005

(65) Prior Publication Data

US 2005/0205140 A1  Sep. 22, 2005

Related U.S. Application Data

(63) Continuation-in-part of application No. 10/644,704, filed on Aug. 19, 2003, which is a continuation-in-part of application No. 09/872,233, filed on May 31, 2001, now Pat. No. 6,607,007.

(60) Provisional application No. 60/615,273, filed on Oct. 1, 2004, provisional application No. 60/548,759, filed on Feb. 26, 2004.

(51) Int. Cl.
   *F16K 1/46* (2006.01)
(52) U.S. Cl. .................. 251/121; 251/357; 251/900
(58) Field of Classification Search ............. 137/614.2; 251/121, 265, 266, 267, 274, 276, 282, 357, 251/368, 900
   See application file for complete search history.

(56) References Cited

U.S. PATENT DOCUMENTS

| | | | |
|---|---|---|---|
| 270,353 A | 1/1883 | Waddell | |
| 368,073 A | 8/1887 | Convert | |
| 1,510,528 A | 10/1924 | Sebenste | |
| 1,662,291 A | 3/1928 | Bastian | |
| 1,772,406 A | 8/1930 | Whiton | |
| 2,270,932 A | 1/1942 | Cornelius | |
| 2,542,390 A * | 2/1951 | Brown | 251/900 |
| 2,713,989 A * | 7/1955 | Bryant | 251/900 |
| 3,007,674 A | 11/1961 | Lorenz et al. | |
| 3,064,696 A | 11/1962 | Gruenewald | |
| 3,085,783 A | 4/1963 | Pulling | |
| 3,458,170 A | 7/1969 | Vogeli | |
| 3,511,470 A | 5/1970 | Beckett et al. | |
| 3,589,671 A | 6/1971 | Strache | |
| 3,658,082 A | 4/1972 | DiTirro | |
| 3,911,947 A | 10/1975 | Boxall | |
| 3,911,948 A | 10/1975 | Collins, Jr. et al. | |
| 3,918,484 A | 11/1975 | Lamb | |
| 3,926,208 A | 12/1975 | Hoffman et al. | |
| 3,951,381 A | 4/1976 | Whitener | |

(Continued)

FOREIGN PATENT DOCUMENTS

GB  2114269 A  8/1983

*Primary Examiner*—John Rivell
(74) *Attorney, Agent, or Firm*—Rod D. Baker

(57) ABSTRACT

A combined valve-regulator apparatus, for safely regulating the flow of combustible gases such as oxygen. A compressible o-ring is used to provide controllable sealed seating of the valve and regulator during operation. A system is provided in the valve-regulator apparatus for venting the o-ring seat elements, to minimize undesirable ballooning or extrusion otherwise resulting from dynamic pressures and changing forces due to rapid gas flows through the regulator.

9 Claims, 13 Drawing Sheets

U.S. PATENT DOCUMENTS

| | | |
|---|---|---|
| 3,976,279 A | 8/1976 | Walker |
| 4,139,469 A | 2/1979 | Rainin et al. |
| 4,157,808 A | 6/1979 | Eidsmore |
| 4,211,386 A | 7/1980 | Yocum et al. |
| 4,228,821 A | 10/1980 | Stark |
| 4,258,925 A * | 3/1981 | Guyton ........................ 251/900 |
| 4,445,532 A | 5/1984 | Mitchell |
| 4,535,806 A | 8/1985 | Ottung |
| 4,637,426 A | 1/1987 | Lyon |
| 4,735,229 A | 4/1988 | Lancaster |
| 4,799,646 A | 1/1989 | Rollett |
| 4,967,814 A | 11/1990 | Day, Jr. |
| 5,392,825 A | 2/1995 | Mims et al. |
| 5,452,741 A | 9/1995 | Tomita et al. |
| 5,474,104 A | 12/1995 | Borland et al. |
| 5,878,992 A | 3/1999 | Edwards et al. |
| 5,904,178 A | 5/1999 | Bracey et al. |
| 6,102,367 A | 8/2000 | Schmitz et al. |
| 6,607,007 B1 | 8/2003 | Hull et al. |

\* cited by examiner

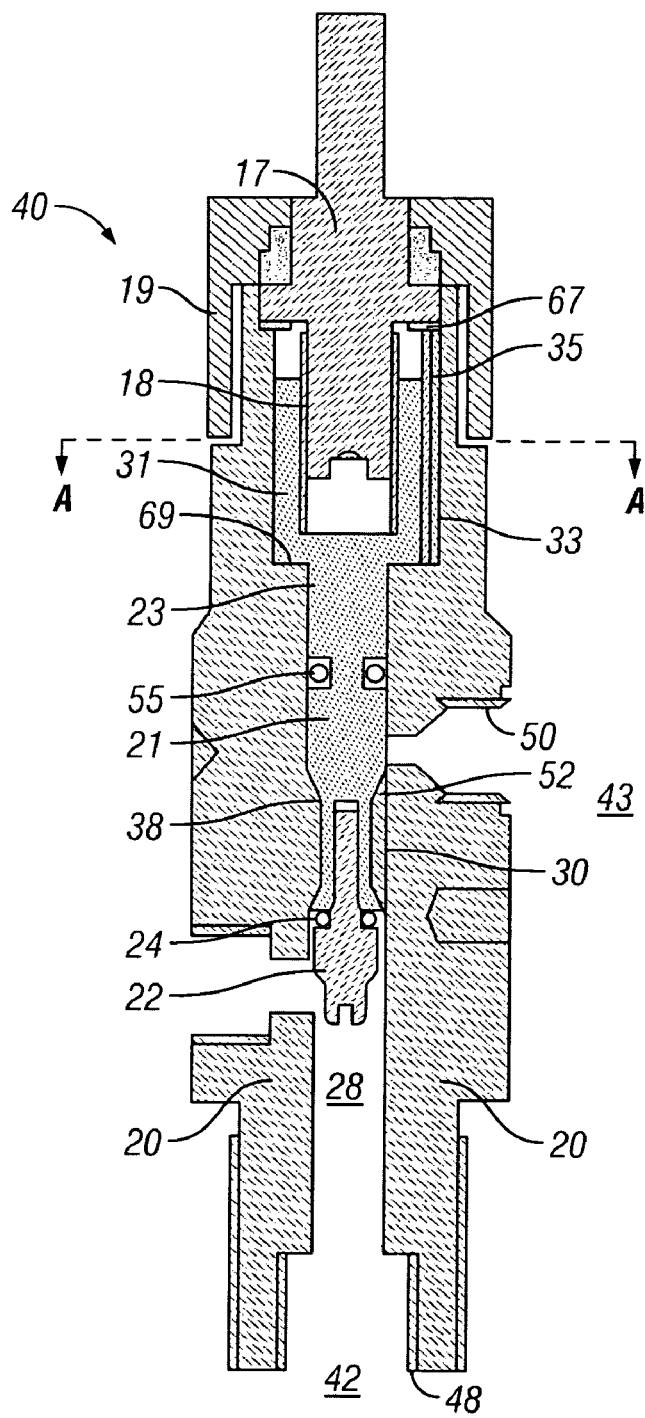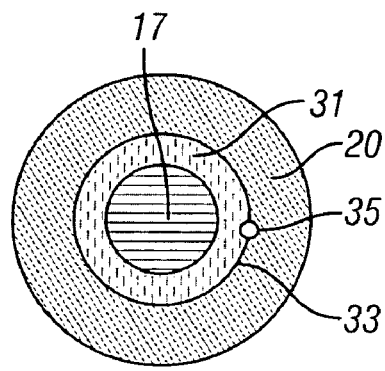
FIG. 1A
FIG. 1

COMBINATION VALVE AND REGULATOR WITH VENTED SEAT FOR USE WITH PRESSURIZED GAS CYLINDERS, PARTICULARLY OXYGEN CYLINDERS

CROSS-REFERENCE TO RELATED APPLICATIONS

This application is a continuation-in-part application of U.S. patent application Ser. No. 10/644,704 entitled "Valve Embodiment and Combination Valve and Regulator for Use with Pressurized Gas Cylinders, Particulalrly Oxygen Cylinders," filed Aug. 19, 2003, which was a continuation-in-part application of U.S. patent application Ser. No. 09/872,233, entitled "Cylinder Valve and Bayonet Check Filter with Excess Flow Protection Feature," now issued as U.S. Pat. No. 6,607,007, and the specifications thereof are incorporated herein by reference.

This application also claims the benefit of the filing of U.S. Provisional Patent Application Ser. No. 60/548,759, entitled "Vented O-ring Seat for Use in Combination Valve and Regulator for Use with Pressurized Gas Cylinders," filed on Feb. 26, 2004, and also of U.S. Provisional Patent Application Ser. No. 60/615,273, entitled "Venting System for Use in Combination Vale and Regulator for Use with Pressurized Gas Cylinders," filed Oct. 1, 2004, and the specifications of both Provisional Applications are incorporated herein by reference.

BACKGROUND OF THE INVENTION

1. Field of the Invention (Technical Field):

The present invention relates to valves and regulators for controlling the flow of fluids, particularly gases, and more specifically to valves for more safely regulating the flow of oxygen gas.

2. Background Art:

Oxygen is widely used in many medical and industrial applications. When a portable source of oxygen is required, it is almost universally supplied in the form of molecular oxygen ($O_2$) under pressure in a cylindrical steel or aluminum container. Oxygen also commonly is transported in such cylinders. The cylinders are equipped with a valve, used to open and close the cylinder for emptying and refilling. A pressure regulator often also is attached to the cylinder valve.

Oxygen cylinder valves, as they exist today, have been implicated in numerous fire incidents with sometimes catastrophic results. When a cylinder valve seat ignites, the attached regulator or manifold system is subjected to strong kindling chain mechanisms that will often lead to fires downstream of the cylinder valve.

The "plug type" cylinder valves presently in common use comprise a rotating threaded seat plug that translates due to the rotation of a hand wheel mounted on the top of the valve itself. The plug incorporates a relatively large nonmetallic seat. The seat is subjected to strong flow impingement during oxygen gas discharge from the cylinder, due to the seat's orientation above the valve nozzle. Further, due to the rotating seat mechanism, the seat often is subjected to strong frictional interference with the valve nozzle. Both of these features are undesirable to prudent persons aware of the fire hazards of handling oxygen cylinders. Conventional known valves are also "dirty," generating large amounts of undesirable debris due to their mode of operation (i.e., rotating seat and threads in the oxygen wetted portion of the valve). This debris often deposits in the nonmetallic seat itself and increases the frictional interactions during valve opening and closing.

These valves most often utilize a nylon main seat although both polyphenylene oxide (PPO) and polychlorotrifluoroethylene (PCTFE) are also utilized. Both nylon and PPO exhibit poor to moderate compatibility based on present oxygen-compatibility rating test standards, and deliver a large amount of energy if ignited. PCTFE is considered an oxygen compatible material, but has a compressive modulus that is insufficient to withstand the torques that are often applied by the manual closing of conventional valves. As a result, PCTFE seated plug-valves often exhibit significant extrusion and recently have been implicated in a large number of fires. The extruded seat increases the surface-area-to-volume ratio for oxygen gas impingement during discharge, and is believed to greatly increase vulnerability of the seat to hazardous flow friction ignition. Further, many of the materials in use with known valves seats generate highly toxic gases when they bum.

There also is a need for an apparatus that combines the function of on-off valving with the flow adjustment capabilities of a flow regulator.

The present invention is an advance over the Applicant's previous valve invention, which is described in pending U.S. patent application Ser. No. 09/872,233, entitled "Cylinder Valve and Bayonet Check Filter with Excess Flow Protection Feature", filed May 31, 2001, now allowed. References herein to the "original design," "original apparatus," or "original device," are to the apparatus disclosed in U.S. patent application Ser. No. 09/872,233, which is incorporated herein by reference

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is an axial (side) sectional view of one embodiment of the apparatus according to the present invention;

FIG. 1A is a radial sectional view of the embodiment of the apparatus shown in FIG. 1, taken along section line A—A in FIG. 1;

Figure 2:
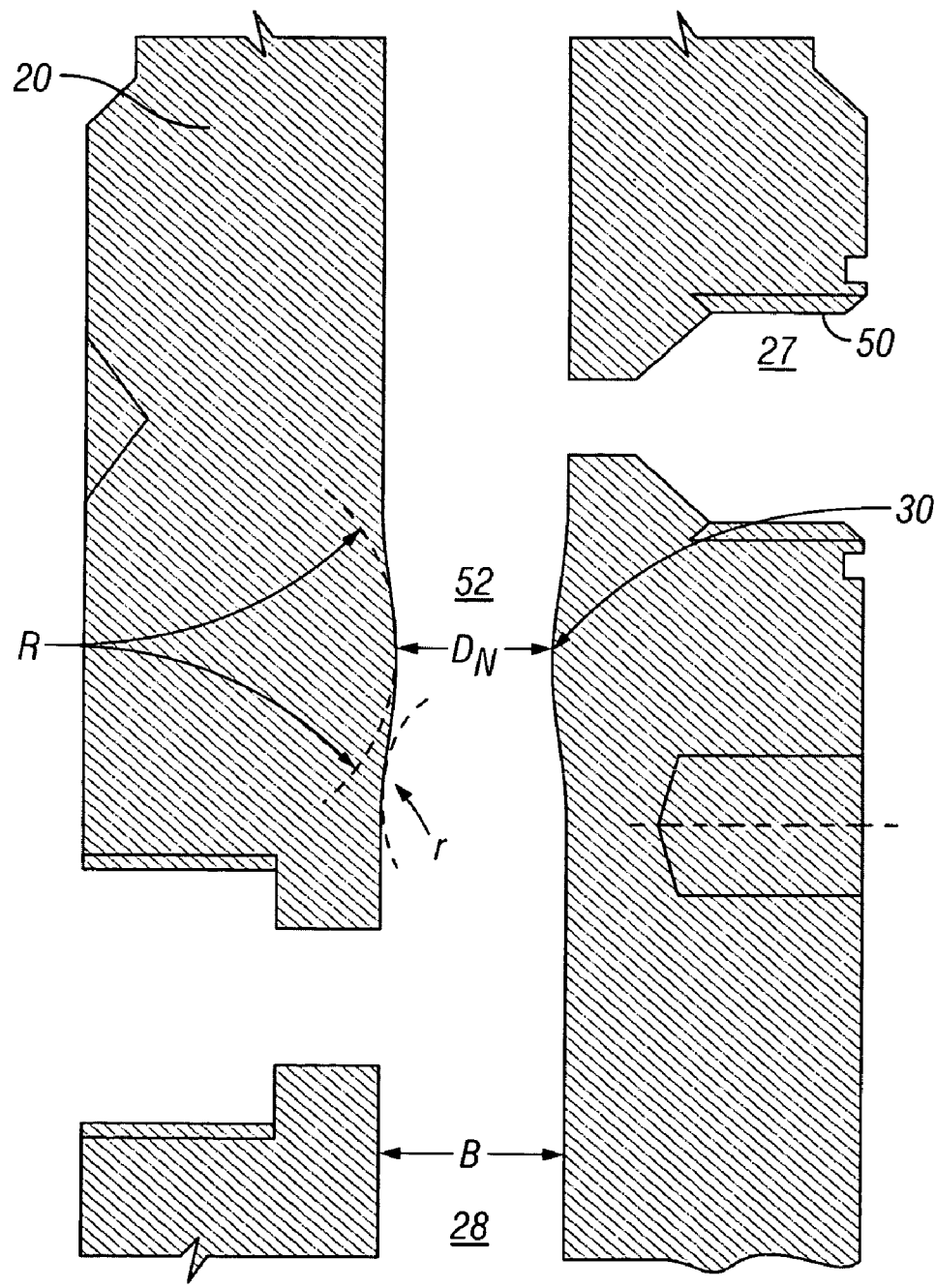
FIG. 2 is an enlarged, axial, sectional view of a medial portion of the apparatus shown in FIG. 1, with the stem component removed and illustrating the configuration of the nozzle passage of the apparatus.

DESCRIPTION OF THE PREFERRED EMBODIMENTS (BEST MODES FOR CARRYING OUT THE INVENTION)

The inventive valve-regulator apparatus ameliorates vulnerability to the common ignition mechanisms that are observed in oxygen systems. The invention satisfies the recommended design criteria that have been established in standards such as ASTM G88, "Design Guide for Oxygen Systems," ASTM G128, "Control of Hazards and Risks in Oxygen Enriched Systems," ASTM G63, "Evaluating Nonmetallic Materials for Oxygen Service," and ASTM G94, "Evaluating Metals for Oxygen Service." The ignition mechanisms that are specifically eliminated by the design features of the present invention are adiabatic compression, flow friction/flow erosion, particle impact, mechanical impact, frictional heating, and kindling chain/promoted ignition. Before disclosing specifics of the invention, its design advantages are discussed generally.

The design of the apparatus ensures that the main seat is protected from the discharge flow and is not subject to "flow impingement." This reduces seat ignition mechanisms such as flow friction and flow erosion. The seat design utilizes an o-ring seal or plastic seal that is located under the nozzle to be fully protected from the high-velocity discharge flow. O-ring seals are not commonly found in known cylinder valve designs, but offer superior performance qualities to plug type plastic seat, for long life and forgiving operation. The seat of the present design, however, can utilize either an o-ring seal or a molded plastic seal; in either case, the seat/seal is located below the nozzle, for superior protection from flow-induced dynamics, rather than above the nozzle as in other cylinder valve designs, which is the worst possible orientation for flow induced ignition potential. Presently known cylinder valve designs, for oxygen service, locate the seat/seal above the nozzle, and ignition of the seat due to this orientation has been implicated in a number of oxygen valve fires.

The inventive design in contrast to presently known cylinder valve designs ensures that all throttling or choked flow of the oxygen during discharge, or charging flow, occurs at a metal-to-metal interface. During discharge flow, the throttling occurs downstream of the seat, rather than across the nonmetallic element of the seat, as in the current plug-type valves. During charging flow, the throttling occurs upstream of the seat, but still at a metal-to-metal interface. This design feature reduces ignition potential by "flow erosion/friction," which can be very severe for non-metallic surfaces.

Also, the design of the present valve apparatus permits the apparatus to serve as a highly controllable regulator. In the preferred embodiment, discharge or pressure through the apparatus can be regulated, in addition to the on-off valving function.

In the present valve, no packing is present; rather, a dynamic seal design is used for greater sealing efficiency at high pressure, regardless of the stem location. The valve stem is specially configured to trap and protect the o-ring to prevent ballooning or other deformation of the ring under pressure.

Preferably, the metals and nonmetals from which the invention is fabricated exhibit the best oxygen compatibility and histories of use for materials utilized in oxygen service. In the preferred embodiment, such materials are consistent with the guidelines provides in ASTM G63 and ASTM G94.

It should be understood that the valve-regulator of the present invention is suitable for use with any gas whose flow is to be controlled by the operation of a valve. However, the apparatus is particularly well-suited to improve the safety of valved and regulated flow of any gas, including many hazardous or combustible gases. Also, it is to be noted that the valve according to the invention is adapted for use upon the commonly encountered conventional cylinder gas containers. Thus, it may be employed in the "aftermarket" to be installed upon existing cylinders to improve safety. Alternatively, the apparatus may be manufactured and sold as original equipment manufacturer product accompanying new cylinders.

The invention offers a valve-regulator combination, the valving-regulating functions accomplished simultaneously by the same components, while maintaining positive valve opening/closure, and fast fill and discharge as required. The apparatus can be equipped with various outlet connections, such as variable pressure or flow regulation, or adjustable flow discharge. A valve-regulator combined function is achieved using a high-pressure balanced stem and "interstage" pressure zone within the valve body. The configuration minimizes droop/creep at all pressures, including high pressure. The balanced stem keeps adjustment forces low, even for high pressures. Top loading of all components and interchangeability of parts between valve components and valve/regulator components improves the versatility and maintenance of the apparatus.

A significant feature of the apparatus is the design permitting the use of o-rings manufactured of PCTFE and other oxygen-compatible materials. The apparatus is configured to provide a specialized seat squeeze and capture, so that the potentially vulnerable o-ring performs a necessary sealing function without ballooning or extruding during operation of the apparatus. A marked advantage is the incorporation of an o-ring seat that it is comparatively oxygen-compatible and yet protected from deleterious impacts and abrasions. The nonmetallic oxygen-compatible polymer materials are protected from overload by physical stops, and are not overstressed by design. Known "plug style" designs do not protect critical soft-goods, and almost ensure overload during use. In contrast, the apparatus of the invention does not overstress non-metallic materials so all materials can be chosen based on superior compatibility with the regulated fluid.

Some of the most oxygen-compatible materials (e.g., Teflon®) also produce toxic combustion products if burning. The apparatus minimizes ignition probability by protecting nonmetallic materials; again, allowing the most compatible materials to be used, but also minimizing the size/quantity of polymeric components. By inhibiting ignition, the apparatus hinders the delivery of toxic products to downstream breathing systems in the unlikely incidence of polymer ignition.

Furthermore in the event of accidental ignition, the post-ignition reaction in this apparatus is lower since this is an inherent property of the more compatible nonmetallic materials. Present "plug style" designs use nonmetallic materials having high heats of combustion and energy release to promote ignition of attached components. The invention features compatible metal/nonmetallic materials that burn slowly and release low amounts of energy.

Another significant feature of the invention is an improved "two point guidance" configuration. The inventive apparatus is configured to provide guidance for the axially movable stem at both the upper and lower sections of the stem. By such guidance, the o-ring seat is smoothly moved into and out of the nozzle portion of the apparatus with minimized risk of o-ring abrasion. Further, the two-point guidance prevents deleterious stem flutter during operation. The configuration of the stem also increases turbulence and heat rejection for rapid pressurization compression heating, thus avoiding combustion of the seat.

The invention also features an advantageously long-radius nozzle transition, which is complementary with the captured o-ring feature and two-point stem guidance to permit the use of potentially fragile, but oxygen-compatible, materials in the o-ring seat.

Yet another advantageous feature of the apparatus is an innovative anti-rotation component, such as an axial guide pin, that promotes positive guidance of the lower stem while preventing undesirable stem rotation at all positions of the stem, i.e., through the range of the valve movement.

The inventive valve is designed to maximize the safety for users by decreasing the known ignition mechanisms normally active in oxidizing gas service. Adiabatic compression due to reverse flow is minimized by a reversed bore in the outlet of the valve to restrict flow entering the valve, and a stem design that increases turbulent mixing which reduces compression heating (verified by thermal imaging in prototype testing by Applicants). Flow friction hazards are minimized, since the apparatus does not subject nonmetallic materials to direct flow impingement, thus reducing seat stress and heating. Promoted combustion is also minimized, due to the close tolerance between internal stem and nozzle, to further restrict/protect reverse flow (including combustion flow) from the nonmetallic seat.

The foregoing advantages allow use of the invention in high-pressure applications, since molded seats and/or alternate non-extrusion materials can be employed, and the apparatus maintains superiority of seating condition for all pressures. Indeed, the seat is configured to be pressure-actuating, so it seals better at higher pressure.

Of great importance is that the design allows for the use of the compatible polymers (i.e., PTFE Teflon®, CTFE Neoflon®, Viton®), whereas up until now these more compatible polymers could not be utilized due to the loading demands required by the plug style designs. These plug style designs normally overload the nonmetallic material seats, and therefore only the most mechanically strong softgoods (but low compatibility) have historically been used. The invention allows the most compatible material to be used in components such as o-rings, and does not overload the materials by design. One great advantage of using the more compatible polymers is the significantly lower risk of ignition and the lower energy release if they do ignite.

The invention minimizes or eliminates the three most common ignition mechanisms (adiabatic compression, flow friction, and promoted combustion) by its design. Thus, the apparatus is safer from a design standpoint as well as utilizes more compatible materials in general, as compared to other similar devices on the market.

The ignition mechanism of adiabatic compression is due to the heating that occurs when a gas is rapidly compressed. The inventive apparatus is very slow opening and therefore rapid compression downstream does not occur. For rapid compression of reverse flow gases (like during cylinder filling operations), the design provides high heat rejection due to the metallic elements in the design configuration and also induces turbulent mixing as gas is entering the valve. This mixing increases heat rejection.

The apparatus reduces flow friction. During opening transients, the inventive valve deliberately locates the vulnerable nonmetallic material comparatively remotely from regions of high flow, which flow results in hot and cold spot generation in currently known "plug style" designs. In conventional plug style devices, the impingement of flow directly on the nonmetallic plug seat causes hot spot formation in the center of the plug and cold regions on the exterior circumference of the plug, where the flow is expanding. Both experience in the field and the Applicants' CFD analysis confirmed this behavior.

Attention is invited to FIG. 1, showing a longitudinal cross-section of a basic embodiment of the apparatus. The apparatus 40 has a generally cylindrical hollow body 20 with a central longitudinal axis. The body 20 is manufactured from any suitable material, such as brass or stainless steel, known to the industry. Defined by and within the body 20 are the lower or first chamber 28 and the upper or second chamber 27. The valve-regulator 40 is used for controlling the flow of a gas from a high-pressure zone 42, such as the interior of a cylinder container (not shown) to a zone of lower pressure 43, such as a tube or conduit (also not shown) sealably attached to the outlet port 50. It is understood that the valve-regulator 40 can control fluid flow in a reversed direction as well, i.e., when the zones of high and low pressure are reversed as when pressurizing a closed cylinder. The first chamber 28 preferably is a generally cylindrical conduit that opens to, or is in fluid communication with, the high pressure zone 42 via intake port 48. The upper or second chamber 27 is in fluid communication with the zone of lower pressure 43 by way of outlet port 50.

A stem 21 is disposed in the hollow axial bore defined by the body 20 and adjacent the second chamber 27. The stem 21 is of two-piece construction, having a distal stem portion 22 screwed into a proximate stem portion 23. The seat 24 is an annular o-ring, and is attached to stem 21 by being captured between the two separable portions 22, 23 of the stem and is contactable with the nozzle 30 to seal the nozzle passage 52 against the passage of gas, as further described herein. The o-ring seal 24 may be fashioned from an oxygen compatible material such as PTFE Teflon®, CTFE Neoflon®, or Viton® polymers.

The handle 17 has a threaded portion 18 that has a screwed engagement with the correspondingly threaded proximate stem 23. The uppermost part of the proximate portion 23 of the stem 21 has an enlarged diameter, and defines a cylindrical barrel 31 therein, the inside wall of which is threaded to correspond to threads on the lower end of the handle 17. The lower end of the handle screws into the barrel 31 of the stem 21 as seen in FIG. 1. The handle 17 is fixed against axial movement within the handle-engaging portion 19 of the body, but is free to rotate about the axis of the body 20. Due to the screwed engagement of the threaded portion of the handle 17 with the proximate portion of the stem 21, rotation of the handle 17 either pushes or pulls the stem 21 axially within the valve bore.

Referring to both FIGS. 1 and 1A, it is seen that a small axially directed hole 33 is provided at the interface of the barrel portion 31 of the stem 21 and the inside wall of the body 20; such a hole 33 may be provided as by machining semi-cylindrical grooves in the proximate stem portion 23 and the body 20 interior wall. The grooves have a common diameter, so that when radially aligned they define the axial hole or channel 33 for receiving and holding a rod-shaped guide pin 35 of corresponding diameter. The presence of the guide pin 35 mated with the grooves in the barrel 31 of the proximate stem 21 and body 20, respectively, prevents the proximate portion 23 of the stem 21 from rotating, and yet permits the stem to shift up and down smoothly in sliding contact with the body 20. The threads of the barrel 31 and of the threaded portion 18 of the handle are fine, with a low pitch (e.g. 5/16-24), such that the rotation of the handle 17 results in a slow, gradual, movement of the stem 21.

The handle 17 thus is rotatable (either clockwise or counterclockwise) within the cavity in the body 20, so that when the handle is rotated, the stem 21 does not rotate. The rotary motion of the handle 17 therefore is not imparted to the stem 21. However, as the handle 17 rotates, the stem 21 shifts axially due to its screwed engagement with the handle 17.

The longitudinal travel of the stem 21 preferably is controlled by contact of the larger-diameter barrel 31 of the stem 21 with an upper close stop 67 or with the lower open stop 69 on body 20. For example in FIG. 1, the stem barrel 31 has contacted the lower "open" stop 69, preventing the stem 21 from moving any further downward, thereby indicating a "full open" condition. Similarly, when the handle 17 is rotated to draw the stem axially upward, the barrel 31 eventually will contact the upper close stop 67, preventing the stem 21 from traveling any further upward (and thus preventing damage to the seat 24) and indicating a "full closed" condition.

Consequently, when the handle 17 is rotated, only the handle rotates about the valve axis in relation to the body and in relation to the stem 21. As the handle rotates, the axial shifting of the barrel 31 causes the entire stem 21 to shift axially a corresponding amount, as the handle during clockwise rotation "pushes" the stem down into the valve body 20, and during counterclockwise rotation "pulls" the stem up or from the valve body. Contact between the stem 21 and the body 20 is a smooth sliding contact, generating little or no debris from surface abrasion. Rotation of the handle 17 in the handle-engaging portion 19 controllably moves the non-rotating stem 21 axially to move the seat 24 into and out of contact with the nozzle 30 thereby closing and opening the passage 52 to the flow of gas.

Advantageously, any debris generated by the repeated screwed movement of the handle 17 in the proximate portion 23 of the stem is trapped and collected in the interior of the barrel 31. The debris thus is prevented from entering the wetted zones of the valve 40 where it poses a combustion hazard.

FIG. 2 is an enlarged view of a medial portion of the body 20 the apparatus 40 showing the special configuration of the nozzle 30. The nozzle 30 is within the body 20 and preferably is machined or otherwise formed integrally with the body. The nozzle separates the chambers 27, 28 and has a high-pressure side adjacent the first chamber 28, a low-pressure side adjacent the second chamber 27. Unlike conventional valves, the valve-regulator 40 according to the invention has a nozzle 30 that lacks an abrupt, well-defined orifice; rather the nozzle 30 is defined by a very long radius transition. Progressing downward from the upper chamber 27, the nozzle 30 constricts very gradually to a defined annulus of minimum diameter $D_N$, then progressing further downward toward the lower chamber 28, has gradually diverging walls to open toward the zone of higher pressure. It is seen therefore, that a convexly curved interior wall of the body defines the nozzle 30. The nozzle 30 defines the constricted passage 52 for the flow of gas between the chambers 27, 28.

A characteristic of the nozzle 30 is the gentleness of its curves. In one embodiment, the nominal diameter B of the bore is approximately 0.235 inches. The wall of the passage 52 is defined by a long-radius concave curve with a radius R of, for example, approximately 0.5 inches±5%, as seen in FIG. 2. Short-radius transitions, where the passage walls join with the cylindrical wall of the bore, are defined by convex curves of radius r, also as shown in FIG. 2. For a long radius R of 0.50 inches, the short radius r may be approximately 0.3 inches±5%. In a preferred embodiment having a long radius R of approximately 0.5 inches, the nozzle minimum diameter $D_N$ is approximately 0.208 inches±5%. Preferably, the ratio of long radius R to the nozzle minimum diameter $D_N$ accordingly is, therefore between 2.53 and 2.27 to 1. These dimensions are offered by way of example, rather than limitation, but may serve as proportional standards for the configuration of larger or smaller versions of the apparatus. Further, most known valves have substantially smaller transition radius to orifice diameter ratios.

One advantage of the gentleness of the transitional curves of the nozzle 30 is realized during the assembly of the apparatus 40. Referring to FIGS. 1 and 2, the valve 40 is assembled from the top, i.e., the fully assembled stem 21 is lowered into the valve bore from the opening in the top of the body 20 (with handle 17 removed). The upper large radius of curvature of the nozzle 30 facilitates installation of the stem 21 without ripping or scuffing the seat 24. The careful insertion of the stem 21 into the bore poses little risk of damage to the seat 24, as the gradual profile of the nozzle 30 is unlikely to cut or damage the seat.

The lower large radius of nozzle curvature offers the advantage of a high level of flow control during the transition, on a first or return stroke, between an open and a closed, or a closed and an open, valve condition. The gradual character of the nozzle 30 profile permits the transitional area in flow to be minutely adjusted by the apparatus operator.

Figure 3A:
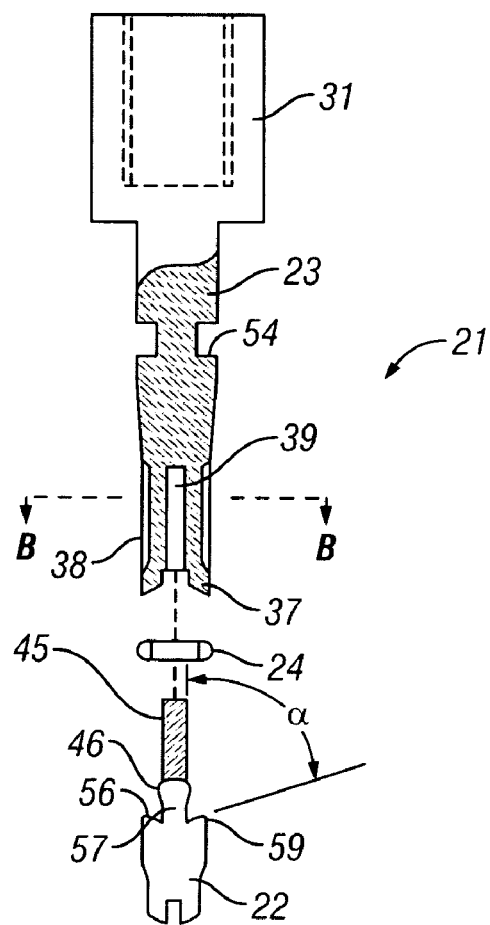
FIG. 3A is an enlarged exploded and partially sectional view of components of the stem of the apparatus shown in FIG. 1.
Figure 3B:
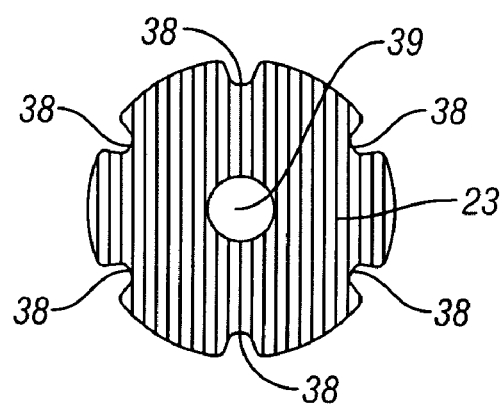
FIG. 3B is an enlarged radial section of the proximate stem portion seen in FIG. 3A, taken along section line B—B in FIG. 3A.

FIGS. 3A and 3B depict the details of the stem 21. The stem 21 has the upper or proximate portion 23, and the lower or distal portion 22. Proximate portion 23 defines in its upper end the threaded barrel 31 into which the handle assembly is screwed, as described previously. Also defined in the proximate portion 23 is the circumferential groove 54 for receiving and retaining the o-ring seal 55 seen in FIG. 1. The lower shaft of the proximate portion 23 is milled or otherwise machined to have a plurality, preferably six, equidistantly spaced, axial stem flow grooves 38, as best seen in FIG. 3B. These grooves 38 are provided to permit adequate gas flow area between the stem 21 and body 20 during valve operation, despite the very close tolerances between the outside diameter of the stem 21 and the inside diameter B of the bore defined in the body 20. In one embodiment, the stem grooves 38 are about 0.0625 inches wide, and 0.017 inches deep, with the ends of the grooves rounded at 0.0625 inches radius to foster fluid flow into and out of the grooves. The axial screw socket hole 39 is threaded (e.g. #1–64) to permit the correspondingly threaded stock 45 of the distal portion 22 to be securely screwed therein. It also will be understood by one of ordinary skill in the art that another means, besides channel grooves, may provide the gas flow area in the stem. For example, the proximate portion 23 of the stem may have a certain segment of its length defined by a polygonal cross section (e.g., hexagon or octagon, which may be more affordably machined), and whereby the gas flow is between the planar faces of the polygonal stem while the edges thereof have the close tolerances adjacent to the nozzle wall to prevent lateral stem shifting.

The lowermost end of the proximate stem portion 23, the annular terminus surrounding the opening of the axial hole or socket 39, is chamfered inwardly so as to define a concavity sloping upward toward the hole 39, as indicated in the figures. The angle of the chamfer is not critical, but preferably is between about 20° and about 50° (from the stem's axis). This chamfered or inclined aspect of the terminus of the proximate stem portion 23 is devised to cooperate with a part of the distal stem portion 22 to effectively but gently trap the seat 24, as shall be further explained. Near the terminus of the proximate stem portion 23, between two adjacent stem flow grooves 38 a minute vent hole 37 is drilled radially from the outside of the stem 23 to the screw hole 39; the vent hole 37 vents the interior of the o-ring seat 24 when the entire stem 21 is fully assembled and installed in the valve 40.

The distal stem portion 22 has threaded stock 45 and shoulder 46 which permit the distal stem portion 22 to be securely, but reversibly, connected to the proximate stem portion by tightly screwing the stock 45 into the socket 39 until the shoulder 46 abuts the lower end of the proximate stem portion 23.

The remaining features of the distal stem portion 22 are carefully crafted to accommodate and protect the seat 24. As suggested by FIG. 3A, the o-ring seat 24 is slipped over the stock 45 and gently pushed up and over the shoulder 46 to be situated in the annular pocket 56 defined in the stem 22. The pocket 56 is a depression circumferentially about the distal stem portion 22; the trunk 57 has a diameter somewhat less than the interior diameter of the o-ring seat 24. The bottom of the pocket is defined by an angled ledge 59 which has a reverse angle of angle α; in the preferred embodiment α is an angle of approximately 70°.

Figure 4:
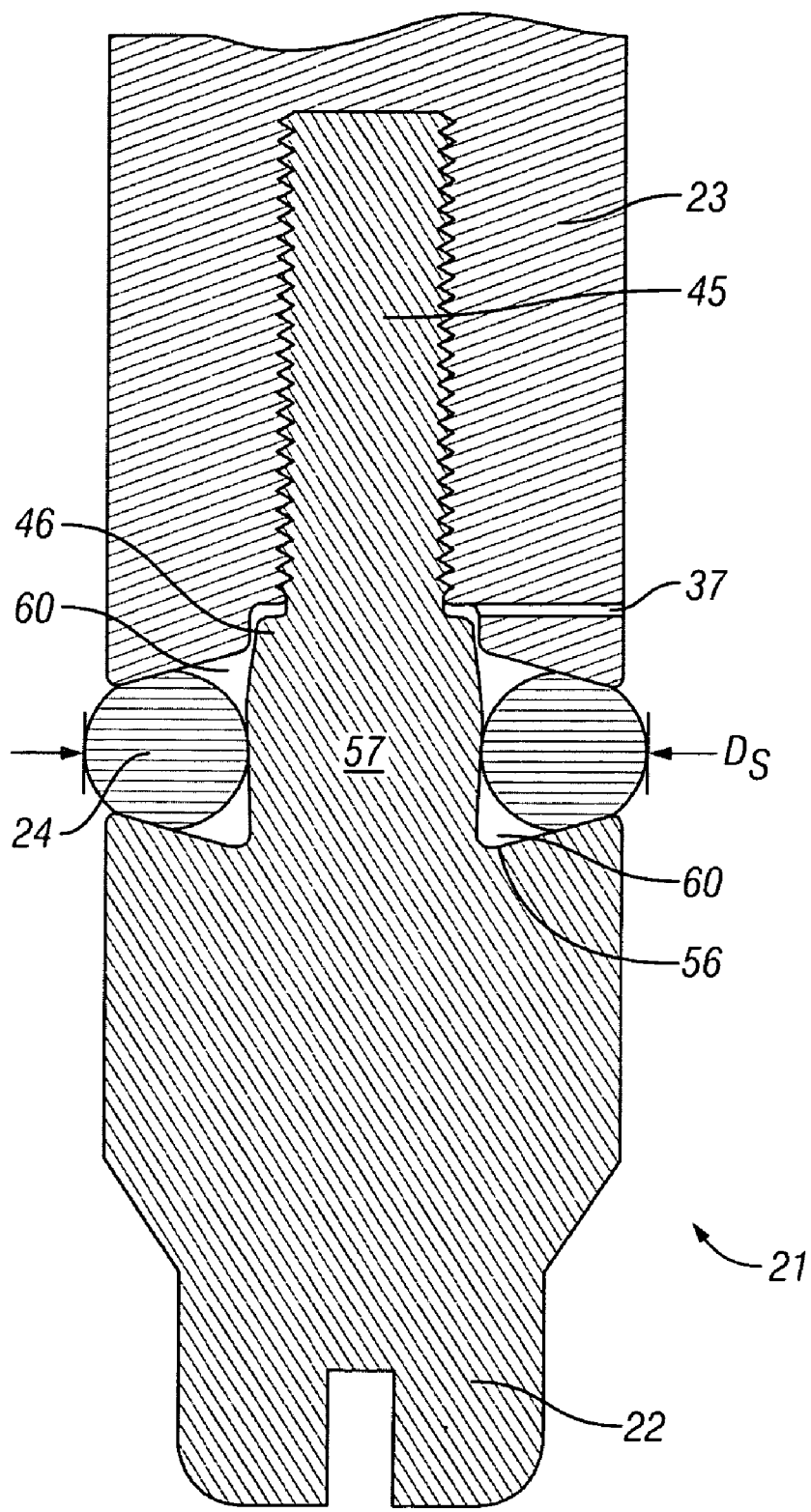
FIG. 4 is a further enlarged view of the components seen in FIG. 3A, shown in a properly assembled condition.

FIG. 4 is a much enlarged view of the union of the two parts 22, 23 of the stem 21 to capture and protect the seat 24 there between. The lowermost, chamfered, end of the proximate stem portion 23 and the angled upper end of the distal stem portion 22 combine to define the cavity or pocket 56 in which the seat 24 is disposed. An advantage of the invention is that the stock 45 has a length, and the shoulder 46 is so located, that when the stock is fully screwed into the proximate stem portion, the seat 24 is captured within the pocket 56 and only gently gripped within the stem 21 so as to expose outside the stem's confines a modest part (e.g. less than one third (33%), and preferably less than one-fourth (25%)) of the toroidal (cross-sectional) circumference of the seat. IN the preferred embodiment, therefore, at least 66%, and more preferably at least 25%, of the total surface area of the o-ring seat 24 is enclosed and protected by the confines of the pocket 56, and a preferred maximum of 33% of the o-ring seat's exterior surface is exposed outside the imaginary cylinder defined by the exterior surfaces of the stem 21.

Further, the pocket 56 is configured to have an axial cross section about 7% to about 10% larger than that of the seat 24, so that when the seat is installed in the stem (but in the absence of any valved flow), a void 60 is provided in the interior of the pocket 56 between the seat and the stem 21. This void 60 is a relief volume that permits the seat 24 to shift radial inward, when radial pressure is applied to the seat (for example, when the valve-regulator 40 is fully closed, or during installation of the stem 21 into the body 20). Permitting the seat 24 to elastically flex inward as needed aids in protecting the seat from damage.

Further referring to FIG. 4, it also is observed that the squeeze applied to the seat 24 by the screwed engagement of the fully connected stem portions 22, 23 causes the seat to bulge radial outward so that the seat diameter $D_s$ slightly exceeds the nominal diameter of the stem 21 itself. For example, in one preferred embodiment having a nominal stem diameter of 0.206 inches, the seat diameter $D_s$ is from approximately 0.224 inches to approximately 0.232 inches. The modest amount of seat 24 protruding beyond the confines of the stem pocket 56 permits the seat to be fully functional as a sealing element, yet the bulk of the seat remains protected. In the event potentially damaging excess physical force is imposed inwardly on the seat, it can retract into the void 60 rather than tearing or rupturing under the force. The stem vent hole 37 nevertheless promotes stabilizing of pressures between the exterior of the stem 21 and the interior void 60 within the pocket 56.

Figure 5:
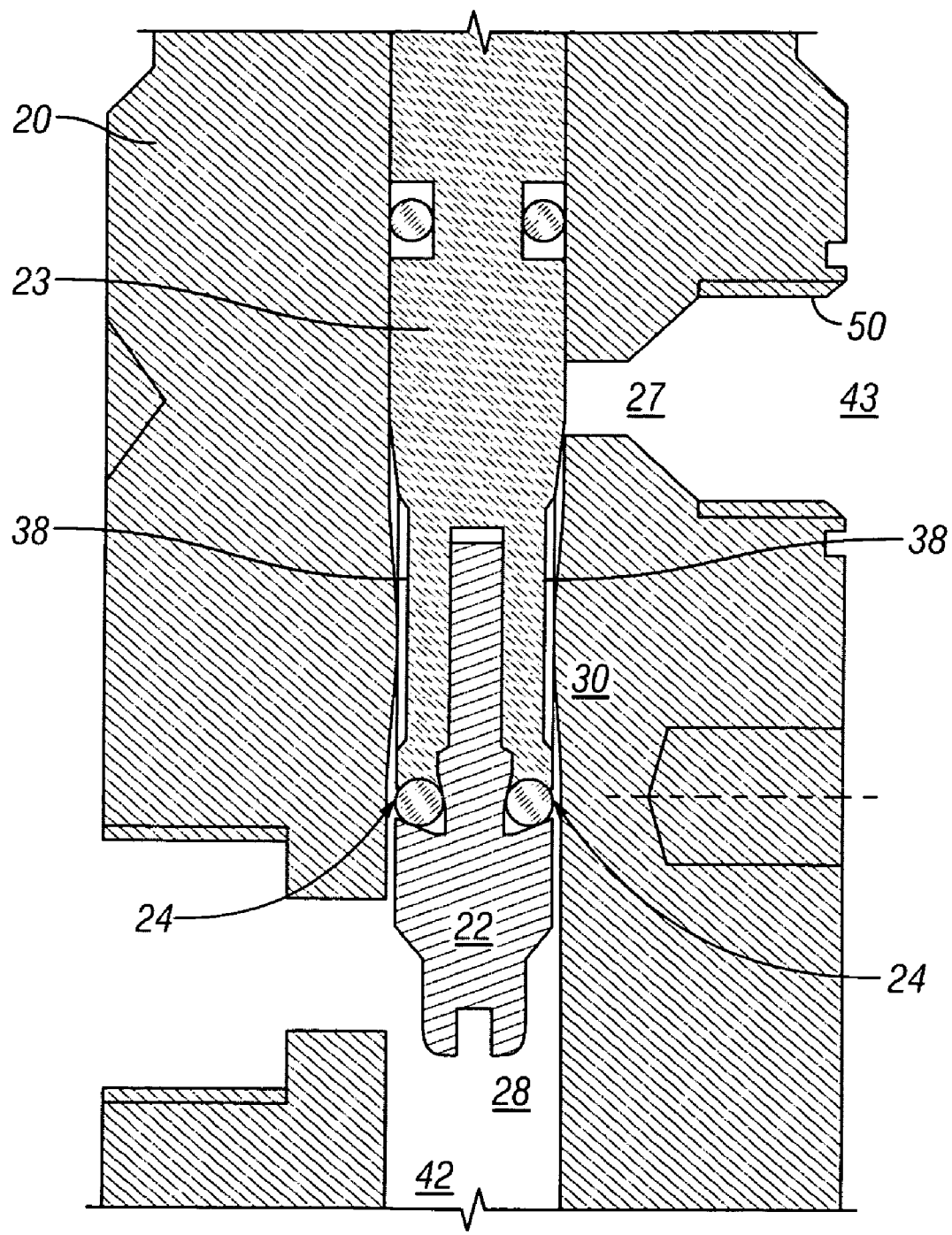
FIG. 5 is an enlarged axial sectional view of a medial portion of the apparatus seen in FIG. 1, showing the stem in an open position within the body of the valve.

FIG. 5 shows is an enlarged view of the portion of the body 20, in the region of the nozzle 30, seen in FIG. 1, with the stem 21 situated in a full open condition. In the open position, gas passes from the high pressure zone 42 past the distal portion 22 of the stem, past the seat 24, and into the stem grooves 38. The stem grooves 38 permit the gas to flow through the passageway 52 (FIG. 2) of the nozzle 30, between the proximate portion 23 of stem 21 and the wall of the body 20. The very close tolerance between the exterior circumference of the stem portion 23 nevertheless is maintained at the surface of the stem portion 23 between the grooves 38, maintaining the two-point stem guidance advantage.

Figure 6:
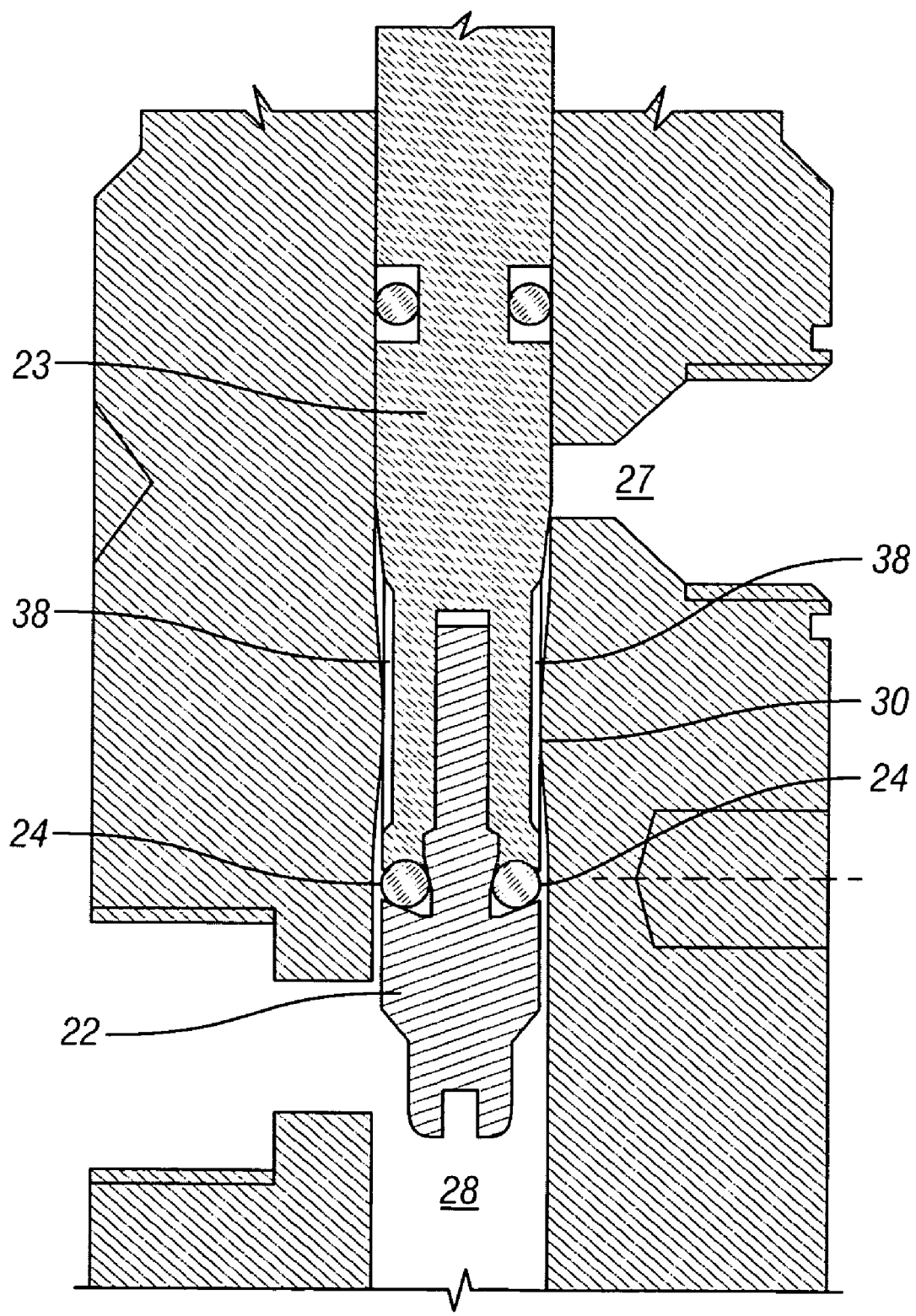
FIG. 6 is another view of the apparatus as depicted in FIG. 5, showing the stem shifted to a full closed position within the body of the valve according to the invention.

FIG. 6 depicts the stem 21 in the full closed position. Rotation of the handle 17 pulls the stem 21 from the full open to the full closed position; intermediately between these extreme positions, the annular gap between the lowermost end of the proximate stem portion 23 is continuously but gradually varied to regulate the flow of gas through the passage 52 of the nozzle 30 (FIG. 2). A marked advantage of the invention is that the o-ring seat 24 is mostly protected from contact with flowing fluid throughout the total stroke of the stem 21. Only when the seat 24 is drawn extremely near the constriction of the nozzle 30 (i.e. the transition of small radius r to large radius R (FIG. 2)) does system pressure slightly extrude the seat 24 from its sheltered location between the two portions 22, 23 of the stem 21 thereby to press the seat against the nozzle wall to seal the valve 40 against further fluid flow. The slightly extruded, mildly bulging seat 24 has the sealing contact with the body wall, as seen in FIG. 6, to effectuate the full closed condition for the valve. The stem position depicted in FIG. 6 corresponds to the situation where the top end of the stem barrel 31 abuts the upper stop 67 (FIG. 1). Contact of the top of the stem 21 with the close stop 67 prevents any torque supplied through the handle 17 to be transferred as a compressive force on the seat 24. The apparatus thus prevents damage to the seat 24 as a result of over-torque of the handle 17, a serious problem in most known systems.

The recession of the seat 24 provides a measure of protection for the seat from direct impact thereon of gas flow through the nozzle passage 52 from the first chamber 28 to the second chamber 27 of the valve. As seen in FIGS. 4–6, the seat 24 is squeezed by the threaded distal stem 22 and is secured into the "dove-tail" pocket 56 or groove that captures and covers a large percentage of the seat. This gentle squeeze between the two pieces of the stem 21 grabs the seat, and prevents ballooning during flowing conditions. As suggested in FIG. 4, the squeeze also mildly compresses the seat 24 so that its outside diameter $D_s$ is preset to a selected diameter. In a preferred embodiment, the selected preset diameter is, for example, from about 0.224 inches to about 0.232 inches. In all embodiments, the selected seat diameter is set to dimension necessary to ensure that, when the apparatus 40 is positioned with the seat 24 near the nozzle 30, the apparatus predictably regulates flow. The dove-tail pocket 56 provides sufficient void volume 60 to allow the o-ring 24 to fill the pocket 56 when the stem 21 is positioned fully in the nozzle 30, but captures the majority of the cross-section of the o-ring 24 to provide positive retention during all stem positions.

This feature, of capturing the seat 24 around a large percentage of its toroidal circumference, also provides greater protection against ignition by substantially reducing the exposure of the seat 24 to active ignition mechanisms (i.e., flow friction, adiabatic compression, etc.).

Axial movement of the stem 21 varies the distance between the seat 24 and the lower gently curved surface of the nozzle 30, the distance variable between zero (closed, FIG. 6) and a maximum (full open, FIG. 5). During the opening of the valve 40, the harshest gas impacts are directed against the lower-most tip of the distal stem portion 22 of the stem 21, and between the metal-surrounded stem grooves 38 and the metal nozzle 30. Since the grooved portion of the proximate stem 23 and the nozzle 30 each preferably are made from a durable metal, all the throttling of the gas during a charging flow or a discharging flow through the valve 40 advantageously occurs between the comparatively damage- and combustion-resistant metal grooves 38 and metal nozzle 30 defined by the body 20. This is an improvement over known devices, where throttling of the gas typically occurs between a nozzle and a relatively fragile and combustible nonmetal valve seat 24.

Opening the valve 40, axial movement of the distal portion 22 of the stem 21 into the first chamber 28 retracts the seat 24 from the bore wall, and increases the distance between the lower end of the proximate stem portion 23 and the nozzle 30, and the rate of dilation of that distance increases with continuing rotation of the handle 17. Due to the positional relationships of the stem's surface and the curved surface of the nozzle 30, the rate of dilation of the distance there-between does not accelerate in the rapid fashion characteristic of known valves. Rather, the initial rotation of the handle 17 separates the seat 24 from the high pressure side of the nozzle 30, but simultaneously induces first a gradual departure of the stem 21 from the curved surface of the nozzle 30. In this manner, the danger of a sudden, sonic velocity "rush" of gas from the high pressure zone 42 through the passage 52 to the zone of lower pressure 43 is substantially and advantageously reduced.

The o-ring seat 24 is subjected to "ballooning" forces anytime the seat 24 is close to the nozzle 30. These flow forces create a pressure differential across the seat's cross section that tends to enlarge the seat's diameter (i.e., "balloon" the o-ring). In order to control these forces, the configuration of the pocket 56 and the location of the stem shoulder 46 provide that, when the distal stem 22 is screwed completely into the proximate stem 23, the o-ring seat 24 is subjected to a predetermined squeeze, fully capturing the seat. This configuration stabilizes the seat, and effectively eliminates uncontrolled extrusion, with an o-ring hardness of approximately 90 durometer.

The pressure equalization vent hole 37 helps equalize pressure differentials across the seat 24 during dynamic flow conditions. Since flowing gases cause a reduction in static pressure, the inside and outside diameters of the seat 24 are subjected to a differential pressure, thus exaggerating the potentially deleterious "ballooning" forces.

The apparatus 40 very preferably employs a 90-durometer elastomeric seat 24. Provided that 90-durometer seats are utilized, long cycle life is assured without excessive o-ring extrusion. Non-metallic materials can be adapted with different suitable properties for application in virtually any fluid media and pressure, including very high pressure.

The apparatus thus allows standard o-rings (including those composed of otherwise undesirable materials due to combustion toxicity) to be used in a valve seat 24 where flow must be initiated and also shut off repeatedly. Oxygen-compatible o-rings tend to balloon out with pressure application or to extrude under gas flow. Because the two-piece stem 21 effectively captures and squeezes the seat 24 while still providing sufficient void volume 60 to repeatedly load and unload (i.e., gives the o-ring somewhere to go when loading), an elastomeric o-ring can be reliably used as a valve seat. The invention allows common elastomeric o-rings to be used in a functional way as a high-pressure valve seat (loaded and unloaded), and is appropriate for many different applications. These features allow for many different implementations for the use of standard o-rings to be used as a seating mechanism.

It was determined that the stem 21 requires guidance by two-point contact (upper and lower contact points) throughout its full stroke. In one preferred embodiment, associated with previously offered exemplary dimensions, the total stem stroke is approximately 0.157 inches. In the absence of two-point guidance, the stem 21 moves and creates wear on the stem and extrusion failure of the o-ring seat 24. Accordingly, the present invention provides two-point guidance throughout the stroke of the valve. The guidance mechanism ensures that the stem 21 stays centered in the valve bore throughout its full stroke, thereby reducing frictional wear of the stem 21. The guidance also ensures that the seat o-ring 24 moves smoothly into and out of the nozzle 30, minimizing the extrusion clearance during the stroke.

The lower stem guidance is accomplished by maintaining the stem diameter slightly under the body nozzle diameter (minimum diametrical clearance) and adding flow grooves 38 to the proximate stem portion 23. The grooves 38 are configured to flow the same volumetric quantity of gas that the original design allowed, but since the grooves 38 are spaced around the circumference of the stem 21, the guidance provided by the close tolerances of the stem/nozzle diameters is maintained. The grooves 38 are positioned so that the increasing flow area does not develop until the valve undergoes the stroke of a full turn, consistent with the original design of U.S. Pat. No. 6,607,007. An added benefit of the grooves 38 is the heat rejection they induce, and their hindrance to flow impingement on the seat 24 for any reverse flow condition.

Since clearances must be maintained at a minimal level to control extrusion failure of the o-ring 24, careful stem guidance ensures that the o-ring 24 does not have excessive clearance on any one side of the stem 21 due to the stem canting within the bore due to dynamic flow forces. To accomplish this, the proximate stem portion 23 is grooved to maintain the high gas flow area desired, while still maintaining guidance and tight clearances between stem 21 and wall of the body 20. In a preferred embodiment, the outside diameter of the proximate stem portion 23 in the region of the grooves 38, is approximately 0.206 inches, while the minimum inside diameter of the nozzle 30, at the narrowest passage, is approximately 0.208 inches. Accordingly, the difference between the diameter of the stem 21 where it passes through the nozzle 30, and the diameter of the nozzle 30 itself, preferably is about 0.002 inches, or about one thousandth of an inch on each diametric side of the stem. Preferably, the nominal diameter of the proximate stem portion 23 is at least 98% of the nozzle minimum diameter, the close tolerance needed to provide the second point of guidance for the stem 21. This close tolerance between stem 21 and the nozzle 20 prevents significant lateral movement of the stem, and provides the lower point of the "two point" stem guidance. The stem thus tends to open and close with little or no crooked canting within the bore, and undergoes little flutter during dynamic flow.

The grooves 38 are positioned so that they do not affect the flow until after at least one opening turn of the 17 to provide the desirable slow-opening feature. An added benefit of the grooves 38 and maintenance of tight tolerances is that the grooves 38 increase the turbulence during reverse pressurization of the valve 40 (such as would occur during cylinder filling operations). This turbulence, as well as the close tolerances, greatly reduces the effective heating of adiabatic compression since it increases mixing between the low and high pressure gases.

An added benefit of the dual point guidance feature is that the guidance mechanism (the shaft of the proximate stem 23 that features the grooves 38), occupies the passage 52 through the nozzle 30 so that any flow into, or out, of the valve 40 is forced past metallic elements 23 that nearly filled the flow path (the passage 52 through the nozzle 30) for the entire stroke of the valve. This feature offers improved protection for the seat 24 against any ignition mechanisms or combustion process and reduces the quantity of combustion products ejected, by creating flow resistance/turbulence and increased heat rejection. In particular: (1) adiabatic compression heating effect through the valve outlet 50 is reduced—since the heat delivered to the seat by this mechanism is best rejected by metallic elements; (2) combustion product emission at the outlet bore is reduced—since the metallic elements are better suited to reject the heat of combustion of the seat 24 which causes combustion products to flow out of the valve past the metallic elements, which would reject much of the heat produced by the small seat 24; and reduce the concentration of combustion products at the outlet port 50 by cooling those products as they travel to the outlet.

Thus, the stem 21 stem is designed with several features to capture the seat 24, squeeze the seat 24, guide the stem, and provide for the necessary gaseous flow area. A two-piece stem 21 permits squeezing of the seat 24 as discussed previously. The stem flow grooves 38 are preferable to maintain the flow area (channels), while yet providing positive guidance of the lower stem 21 as discussed previously (i.e., the lower portion of the stem cannot "sway" or flutter during flow).

The two-piece stem 21 allows the use of anti-extrusion o-rings, or even plastics, since they do not have to be stretched over the retainer to be positioned into the gland or seat pocket. In most cases, anti-extrusion materials, including plastics, have minimal "memory" and tend to deform plastically when stretched. So, with the inventive two-piece stem, many types of seating materials with appropriate properties can be utilized (both elastomeric materials and plastics).

The long radius nozzle transition R smoothes the extrusion transients acting on the seat 24. The nozzle 24 is profiled with a smooth radius R for the loading of the stem 21 into the upper nozzle, for finer flow control past the lower nozzle during the early stages of valve opening, and to extend the cycle life of the seat 24. The smooth radius (lower) provides for smooth movement of the seat 24 into and out of the nozzle 30, and is designed for a large radius transition. The large radius transition R allows for gradual transition from a no-flow to flow condition, thereby reducing downstream pressurization rates (minimizing adiabatic compression to downstream components). The gradual transition also reduces the extrusion tendency of the o-ring 24 and increases the overall cycle life. This feature is significant to the success of the o-ring seat 24, and functions in a complimentary manner to the squeeze/capture features already discussed.

In order to ensure that the stem 21 does not rotate during adjustment of the apparatus, a pin 35 is provided in the proximate stem portion 23 to allow for only axial movement (up and down), as seen in FIGS. 1 and 1A. The pin 35 provides linear guidance of the stem 21 and distributes the torsional loading along the entire length of the pin. The pin 35 is a stainless steel (or other appropriate material) small-diameter rod inserted in the hole 33 on one side of the valve-regulator. The hole 33 is drilled into the body 20 and proximate stem portion 23, and provides a raising/lowering guide for the lower stem and prevents rotation during opening and closing of the valve. The pin 35 occupies a minimum of the limited available space, while providing for non-rotational guidance throughout the travel range of the valve.

It is seen, therefore, that the unique seat sealing mechanism of the apparatus 40 inherently requires minimal torque to close the valve. Once the valve seat 24 is within the nozzle 30, the seat self-actuates in a controlled manner, and is pressure-aided to seal the nozzle 30 against the passage of gas. This positive closure is realized by design, without excessive load on the seat material.

It also is noted that the apparatus 40 is fully serviceable from the top, without removing the apparatus from the gas cylinder, by the simple expedient of unscrewing the cap 62, which is threaded (i.e. ¾-20), to engage with the threaded exterior of the upper body 20. The ability to service the interior components of the apparatus 40 without removing it from the cylinder to which it is attached offers advantages of service length and system cleanliness. An estimated 25% of cylinder valves are destroyed due to thread stripping incurred during valve removal and replacement. Minimizing the need to detach the apparatus 40 from its associated cylinder for servicing also reduces thread wear and introduction of particulate debris into the cylinder.

The valve materials have virtually non-magnetic signature so applications with MRI equipment are allowed. The design also ensures that the flow rate from the valve is responsive to adjustment and can be easily controlled by the tactile feel/adjustment of the user.

Improvements over the original embodiment (U.S. Pat. No. 6,607,007) and the current apparatus design are mentioned. The diameter of the lower stem 21 was reduced, so that the forces applied to the adjusting screw threads are reduced. This feature increases the cycle life of the apparatus (by virtue of the reduced thread wear). The reduction in the lower stem diameter also allows for an increase in the body wall thickness, so that the valve's resistance to mechanical impact is increased (i.e., higher impact forces required before failure of the body near the body o-ring's reduced diameter).

The wall thickness was increased in the valve body 20 to provide additional structure for resistance to mechanical impact loads. Cylinders are known to fall over, or off of elevated structures, and strike rigid surfaces, thereby applying an impact load to the valve. The wall thickness in valve body in areas vulnerable to failure by this mechanism is increased. Further, either straight threads or tapered threads may be used for the device.

It also is noted that the handle adjusting mechanism 17 is a fully captured mechanism. The captured threads ensure that any debris produced by the threads during service is captured by the stem barrel 31. The present arrangement also includes a finer thread pitch (for finer valve adjustment) and a greater number of engaged threads (lowering the overall thread stress and wear). The captured threads eliminate the "dove-tail" of the original design that had a tendency to spread the threads and increase thread wear. The captured thread design also eliminates the need for left-hand threads, and allows normal right-hand threads to be used for the entire adjusting mechanism. The guide pin 35 was added to provide positive non-rotation of the lower stem during valve opening and closing.

The apparatus' configuration ensures long life of the valve through consistent low load, smooth sliding, seating and unseating, when the valve is opened or closed. The seating is independent of, and protected from, potentially abusive user hand torque inputs. This is in contrast to non-o-ring seated valves, which rely on hand torque that forces a metallic component into high force, high stress, contact with the seat polymer, resulting in progressive deformation and extrusion of the seat polymer to an ever changing shape or configuration. This results in seat wear, shredding, and extrusion displacement and the need for the seat to act as the valve closing stop, exposing it to potential user abuse from hand over-torque.

The body cap 19 was altered to engage the body 20 on the outside to provide additional room to accommodate the upper stem and for the lower stem drive.

The seat o-ring 24 and stem seal o-ring 55 (especially without backup ring seals) feature reduced sizes to provide a minimum quantity of polymer should combustion ever develop. It is known that polymers are the weakest link in any design, from a combustion standpoint, and should an ignition occur, polymer combustion can lead to metals ignition as well as the generation of toxic combustion products. The metals chosen for this design have demonstrated excellent compatibility. The o-ring materials are here chosen since they provide excellent compatibility and are minimized in size to greatly reduce the quantity of heat and toxic products produced if ignition should occur. For example, in a preferred embodiment of the invention, the seat 24 may have a mass of about 30 mg of material that burns with 3300 cal/g, so that an accidental combustion would generate about 99 calories of energy. In contrast, conventional Sherwood-style valves have seats typically having a mass of 100 mg of a substance that burns with 7,500 cal/g, and thus yield 750 calories of energy in the event of combustion. The reduced mass, and comparatively lower energy of combustion, of the seats useable in the inventive apparatus thus pose a reduced combustion hazard, and likely a comparatively lower toxicity of combustion in the event of a combustion accident due to the use of a minimized mass of material.

Accordingly, polymer materials can be chosen for their superior compatibility with oxygen, but since burning polymers are known to produce toxic combustion products (in various quantities), the oxygen-wetted polymeric parts are maintained as small as possible (e.g., to reduce the amount of toxic combustion products that could be produced). The stem seal is reduced to a single o-ring 55, eliminating the two backup rings, and the seat o-ring 24 is reduced to a minimum size. The use of an o-ring for the seat 24 provides the added benefit of eliminating all polymeric material, except for that occupying the toroidal volume (most known seats are larger volume discs of polymeric material, rather than toroidal in shape). Thus, the mass of the polymeric available for combustion is reduced by virtue of the o-ring geometry. The combustion likely also is reduced by the captured configuration of the seat, which effectively hinders ignition and propagation.

Another benefit of the inventive apparatus is provided by the close tolerance incorporated between the stem guides between the grooves 38 and the nozzle 30, which effectively cools hot combustion products exiting (or entering) the valve 40. The cooling of the combustion products by large surface area metallic components helps to condense out toxic products from the gas stream, and thus reduce the quantity that could be ingested by a patient using a flow system incorporating the valve. Accordingly, the invention inherently reduces the potential for toxic product production by minimizing the size/quantity of polymeric components, protecting them against ignition, and hindering the delivery of toxic products to downstream breathing systems by design configuration.

The inventive apparatus 40 thus improves upon the originally developed valve, and incorporates the new technology and superiority of that design. Hence the regulator extension of the valve shown in FIG. 7 incorporates the materials compatibility and risk minimization features of the valve design while implementing regulating features. Both pressure and flow regulation is possible with the present invention. The apparatus inherently ensures that the pressure biasing components (springs, etc.), which are sometimes less compatible, are maintained outside of the fluid wetted areas.

Figure 7:
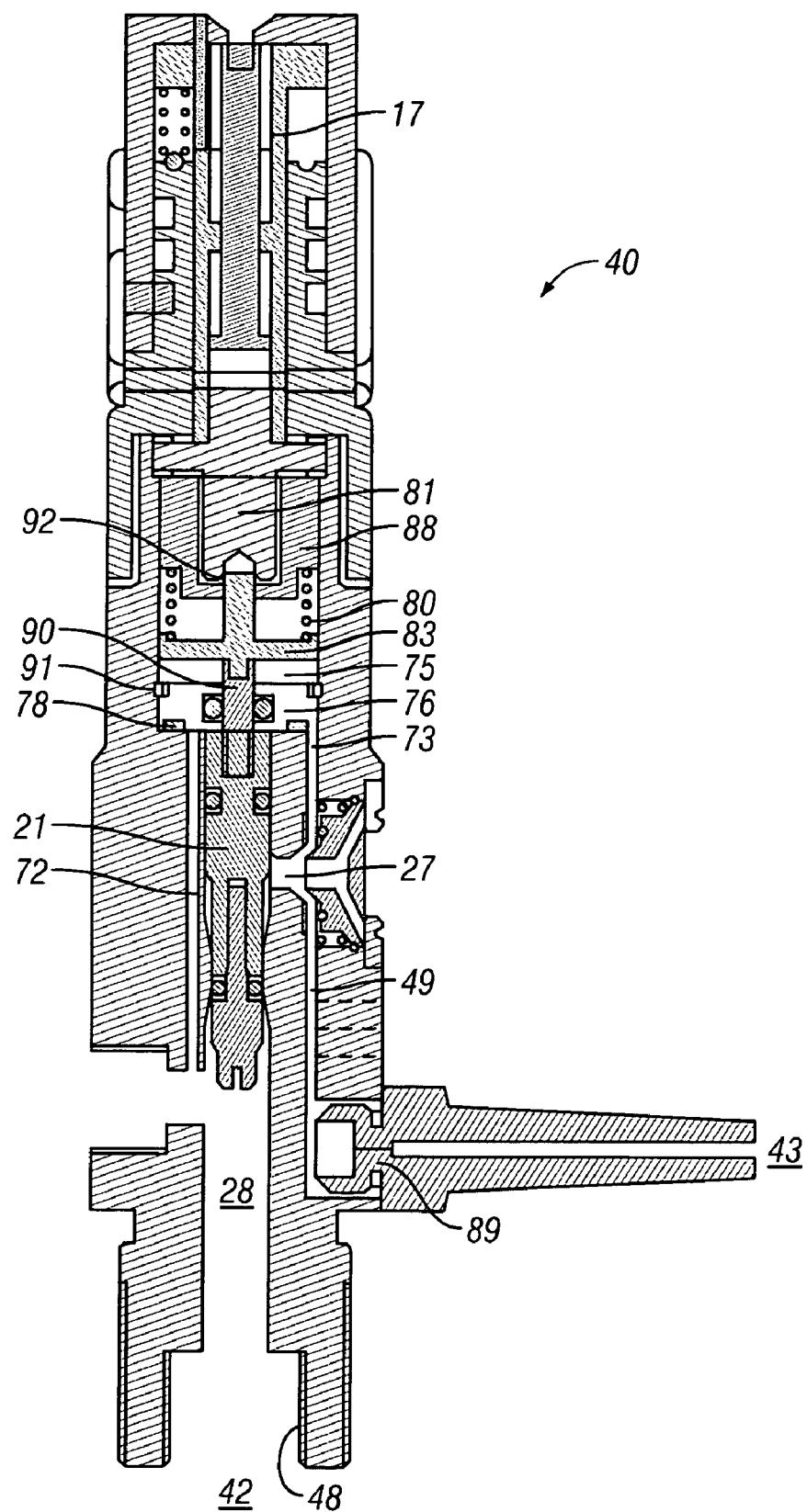
FIG. 7 is an axial (side) sectional view of an alternative embodiment of the valve-regulator according to the present invention.

FIG. 7 shows an alternative embodiment of the invention, an apparatus 40 providing improved flow regulation. The apparatus improves regulation by "balancing" the stem 21, i.e., pressure forces acting on the stem are balanced against the cylinder pressure, so that the force balance does not change with increases or decreases in the cylinder pressure. The balanced stem 21 design not only ensures that the regulated pressure/flow will not change significantly as cylinder pressure decreases (or increases), but it also ensures that the adjustment torque is maintained at a low level.

The embodiment of FIG. 7 is similar in most respects to the previously described embodiments, except for a novel manner in which the handle mechanism interacts with the stem 21. The handle 17 is rotatable in the described manner by any suitable means, and rotation of the handle imparts rotary motion to the handle cylinder 81 as well. Handle cylinder 81 has a threaded exterior threadably engaged with the correspondingly threaded interior of the barrel 88. Rotation of the handle 17 and handle cylinder 81, having screwed engagement with the barrel 88 causes the barrel to shift axially within the body 20. The functional interaction between the cylinder 81 and the barrel 88 thus is generally the same (including catching debris) as that between the handle 17 and the stem barrel 31 as described for the embodiment of FIG. 1, except that the threaded barrel 88 in this embodiment is functionally associated with the handle assembly, rather than being part of the proximate stem 23.

A coil spring 80 or other suitable biasing means extends axially between the lower or distal end of the barrel 88 and a spring flange 83. The spring flange 83 forms a stem piston, which in turn is connected to the proximate end of the stem 21. The connections between the spring flange or stem piston 83, and between the stem 21, may be reversible (as by screwed connection), but during the operation of the invention the stem 21, stem piston or spring flange 83 move axially as if a single unit. An axial extension of the spring flange 83, however, is slightly movable axially in relation to the barrel 88, to-and-fro through a central portal in the bottom of the barrel 88. That is, the threaded barrel member 88 defines a central portal in its bottom, and the central portion of the spring flange extending axially upward passes through the portal, and the extension is free to slide within the portal, and is prevented from being extracted by means of a snap ring. The compression of the balancing spring 80 urges the spring flange 83 away from the barrel 88. As in previous embodiments, the barrel 88 may shift smoothly within the body 20 and in gliding contact with its interior wall.

An axially symmetric extension shaft 90 extending from spring flange 83 passes through a positionally fixed disk 76 and attaches by threads on distal end to the top of the stem 21. This shaft 90 provides a fixed axial reference location of the spring flange 83 to the stem 21. This configuration causes both the spring flange 83 and the stem 21 to move together axially, as a functional unit, as a result of the spring force and the balance of pressures on the distal and the proximate surfaces, respectively, of these two components.

The forces on the spring flange 83 are the spring force on its proximate surface, the interstage pressure in the interstage chamber 75 on its distal surface, and the force transmitted along the axially symmetric shaft element 90, that passes through a central portal or aperture in the fixed disk 76, from the proximate portion 23 of stem 21. It is therefore an object of this invention to provide a pressure, and therefore force, balanced stem 21, in order to limit the force on the spring flange piston 83 to the spring force and the interstage pressure force (i.e., forces resulting from control pressure in the interstage chamber 75. This in turn allows the selection of a reasonably sized regulator spring 80, and an advantageously low adjustment torque of handle 17.

A conduit 72 runs between the lower chamber 28 and the distal (lower) side of the fixed disk 76. There is provided a snap ring 91 or other means, at the proximate side of the disk member 76, engageable with for example a circumferential grove in the body 20, for holding the disk member in position. The disk member is fixed axially in place by the snap ring 91 preferably at the disk's proximal interface with the body 20. The distal side of the disk member 76 effectively is in fluid communication with the lower chamber 28. The fluid pressure in the lower chamber 28 thus may act upon the distal side of the fixed disk 76 and on the proximate end of the proximal portion 23 of stem 21. Suitable packing or gaskets prevent fluid from flowing past the fixed disk 76 and the upper stem 21 past o-ring seal 55 from the conduit 72. The conduit 72 thus constantly subjects the proximal side of the stem 21 to the extant pressure of the lower chamber 28.

The forces on the stem 21 include the force from the spring flange 83 transmitted by the axially symmetric shaft element 90 through the portal in fixed disk 76 into the threaded connection at the proximal end of the stem 21. Also applied to the proximal end of the stem 21 is the pressure of the lower chamber 28, which acts through conduit 72 over the proximal areal difference between the stem 21 and the axially symmetric shaft element 90. This pressure is transmitted through conduit 72 from the lower chamber 28 to the upper end of the stem 21. The area difference between the stem 21 and the axially symmetric shaft element 90 is sized to match the area at the seat 24, which forms the distal area of stem 21, where the extant pressure in chamber 28 thereby acts on the distal end of the stem 21, 23.

A gasket seal 78 on the distal side of the fixed disk 76 precludes fluid flow (and thus pressure transmission) radially past the distal side, between any high pressure region at its inner diameter and any low pressure region at its outer diameter; resulting from pressure transmission from the high pressure zone or from the low pressure zone. A seal also prevents fluid flow between the shaft 90 and the disk 76, yet permits the shaft 90 to shift axially through the central portal of the disk.

This design configuration causes the stem 21, 23 to be pressure balanced and thereby not be subject to axial movement regardless of the pressure fluctuations in the high pressure zone 42. As seen in FIG. 7, a balancing conduit 73 runs from the upper chamber 27, axially past the fixed disk 76, to open into the interstage chamber 75. The cylindrical interstage chamber 75 is a void defined circumferentially by the wall of the body 20, and on its proximate end by the distal side of the spring flange 83, and on its distal end by the proximate side of the fixed disk 76. The balancing conduit 73 provides fluid communication between the interstage chamber 75 and the upper chamber 27. Via the balancing conduit 73, the interstage chamber has substantially the same fluid pressure as the upper chamber 27. This design results in a spring flange piston 83 and stem 21 that are in axial force balance as defined by the tension in the spring 80, which is set by rotation of handle 17, and the pressure in the interstage chamber 75. The dialed in spring force caused by rotation of handle 17 thereby allows the pressure in the upper chamber 27 and at the outlet port 50 to be regulated as desired by the operator.

Any rotation of the handle 17 results in the axial shifting of the barrel 88 (although, as in other embodiments, the barrel itself does not rotate). The axial movement of the barrel 88 results in an increase or decrease in the compression of the balancing spring 80.

It is seen, therefore, that the pressure in the interstage chamber 75 supplies an axial force on the spring flange 83 that is directed oppositely from the force of the balancing spring 80. The balancing spring 80 biases the spring flange 83 (and thus the entire stem 21) axially downward, while the control pressure in the interstage chamber 75 biases the spring flange (and again, the entire stem) axially upward within the body 20 of the valve-regulator. There thus is provided a stem that is "balanced" between the forces of the balancing spring 80 and the control pressure existing in the interstage chamber 75 and the upper chamber 27. When the valve is fully open, of course, there is fluid communication between the upper chamber 27 and the lower chamber 28 of the valve.

The degree of handle actuation thus controls the position of the barrel 88, which determines the compression applied to the spring 80 and the position of the stem 21. Rotating the handle assembly toward an "open" position shifts the barrel 88 downward, which increases slightly the compression in the balancing spring 80 as well as opening the passage 52 (FIG. 2) to fluid flow. By opening the valve by moving the stem 21, the upper chamber 27 is placed in fluid communication (via lower chamber 28) with the zone of higher pressure 42, which, by means of the balancing conduit 73, also increases the pressure in the interstage chamber 75. The pressure on the distal side of the fixed disk 76 and the differential area at the proximal end of stem 21 substantially equals the pressure in the lower chamber 28 due to the function of piston conduit 72. Thus, the pressure on both sides of the stem 21 remains balanced, regardless of the degree of valve opening.

The balanced stem improves flow regulation. It is observed that the operator is able, by controllably "dialing" the handle (metering the handle rotation), to adjust the compression in the balancing spring 80 to offset the control pressure existing in the interstage chamber 75. (FIG. 7 shows a spring-driven incremental handle rotation metering assembly.) Since the stem functions in an environment of "neutral" pressure (i.e., the pressures on the distal and proximate sides of the stem 21 are in relative equilibrium), the flow can be accurately regulated even as the pressure in the zone of higher pressure 42 drops (e.g., lower chamber 28 or alternatively as a pressurized cylinder is discharged). There is, in a balanced stem system, and nearly no resistance to handle rotation, since the screwed drive of the barrel 88 acts only against the regulator spring in atmospheric pressure and does not act against the control pressure of the system. This flow regulation can be further enhanced by a variable orifice discharge assembly 89 of any suitable configuration. Moreover, for the practicing of the present invention, the assembly 89 very preferably includes, at a minimum, a check valve or other blanking device so that the pressure in interstage chamber 75 can be maintained during the practice of the invention. A further embodiment of the invention is the inclusion of a check valve and a quick disconnect at the discharge opening where assembly 89 is attached, or at other alternate ports of choice.

The valve-regulator 40 allows for an infinitely (as distinguished from incremental) adjustable flow range, even though the adjustment knob on the handle 17 may be detented for tactile feel of various adjustment levels. The apparatus can be adjusted to virtually any flow level desired within the design range of the apparatus. Two flow ranges preferably are provided based on market requirements (0–15 lpm and 0–25 lpm). The design also ensures that the flow rate from the valve is responsive to adjustment and can be easily controlled by the tactile feel/adjustment of the user over the entire range of the apparatus. Since the device allows for variable flow control, the control knob may be equipped with an electronic device such as a stepper motor to allow for applications requiring fully automatic flow adjustment. No separate shutoff knob is required for the present apparatus, but positive shutoff is provided by the same knob as for flow adjustment.

The discharge cannula is equipped with a low pressure check valve 89 to ensure that the cylinder is not depleted below a predetermined level. This feature assures that oxygen distributors can refill cylinders without having to test for ingestion of atmospheric contaminants or water. Indeed, the fill and discharge ports provided in the body are configured selectively with low pressure check valves, filters, cannula fittings, hand operated shut off valves, automatic check valves, fixed or variable orifices, fill pressure limiting check valves, quick disconnects, and standardized sealing arrangements. The discharge cannula 89 can be positioned in numerous locations on the device depending on the market requirements.

The regulator body design is presently consistent with a CGA 870 style valve body, but the internal design and operational features can be adapted to a variety of service fluids and applications. Hence, the body style and features can be developed based on the service application of interest. Pertaining to this, either straight threads or tapered threads could be used for the cylinder attachment for the device body.

The regulator provides for flow adjustment that can be finely controlled for both high and low pressure applications. Due to this advantage, and since the manufacturability is estimated to be low cost, the regulator 40 has applicability for many different applications and services such as aviation, paint ball guns, industrial gases, specialty gases, SCUBA diving, and alternative fuel vehicles to name a few. For any of these applications alternative to medical environments, the materials (metals and nonmetals) can be chosen for compatibility rather than or as well as for functionality. In contrast, most plug style designs must use materials that provide functionality only since the more compatible materials (especially nonmetallic materials) are not robust enough to endure the mechanical stresses. Therefore, non-compatible higher fire risk materials are used in plug-style designs largely because they survive their mechanically induced abuse relatively better than the compatible materials, so long as a fire does not occur The inventive valve/regulator combination apparatus allows for both pressure regulation and flow regulation, while maintaining the features of a valve if desired. So, all three functions are provided in the same device (flow or pressure regulation and valve features). This is believed to be unique to the present apparatus, since other components only provide one of these three features. In other words, known devices are either a valve, or a pressure regulator, or a flow regulator. The present invention may function simultaneously as a pressure regulator and valve or a flow regulator and valve. These features are attained due to the unique elements of the internal operating mechanism comprised of elements 17–38 for the valve as well as 72–90 for the valve-regulator. These critical features could be embodied within many different exterior housings to satisfy a variety of valve or valve regulator applications.

It is seen that in the afore-described embodiments of the apparatus of the invention, a stem 21 is disposed in the hollow axial bore 52 defined by the body 20 and adjacent the second chamber 27. The stem 21 is of two-piece construction, having a distal stem portion 22 screwed into a proximate stem portion 23. The seat is an annular o-ring 24, and is attached to the stem by being captured between the two separable portions 22, 23 of the stem and is contactable with the nozzle 30 to seal the nozzle passage 52 against the passage of gas, as described above. The o-ring 24 may be fashioned from an oxygen compatible material such as PTFE Teflon®, CTFE Neoflon®, or Viton® polymers.

In the previously described embodiments, the features of the distal stem portion 22 are carefully crafted to accommodate and protect the o-ring 24. The o-ring seat 24 is slipped over the stock 45 and gently pushed up and over the shoulder 46 to be situated in the annular pocket 56 defined in the stem 21. The pocket 56 is a depression circumferentially about the distal stem portion 22; the trunk 57 has a diameter somewhat less than the interior diameter of the o-ring seat 24. The bottom of the pocket 56 is defined by an angled ledge which has a reverse angle of angle $\alpha$; in the preferred embodiment $\alpha$ is an angle of approximately 70°.

Flow forces during operation of the apparatus cause the o-ring seat 24 to be subjected to "ballooning" forces. In order to control these forces, the configuration of the pocket 56 and the location of the stem shoulder 46 provide that, when the distal stem 22 is screwed completely into the proximate stem 23, the o-ring seat 24 is subjected to a predetermined squeeze, fully capturing the seat. This configuration stabilizes the seat, and effectively eliminates uncontrolled extrusion.

In one preferred embodiment of the apparatus, there is provided an improved mode and configuration for venting the pocket 56 in which the o-ring valve seat 24 is situated. The improved venting feature adds some small drilled passages under the seat o-ring 24 to vent any pressure that builds up under it. That virtually eliminates any potential for ballooning of the o-ring during use. It also reduces the extrusion potential of the o-ring. But, it also reduces somewhat the need for the tight tolerances required in the seat squeeze and diametral clearances in the stem parts 22, 23.

In previous embodiments, a small hole 37 is drilled though the stem 21 on the downstream side of the seat o-ring 24. But such a configuration is only good for one direction of flow. The following described implementations provide for a low pressure reference for the seat regardless of the flow direction.

Thus, the previous embodiments provided means for maintaining control of the o-ring 24 when it was being used as a seating device in a valve for high pressure gases. The means was comprised of a gland which provided radius corner wedge-shaped containment with a preset amount of squeeze. Applicants determined that the single simple vent hole 37 was inadequate to protect the o-ring against deleterious reverse flow that occurs each time a cylinder equipped with the inventive valve is filled.

Applicants determined to drill the improved venting system described further below into the same lower and upper stem pieces 22, 23 that had previously been used, install a new o-ring 24 and cycle test the improved embodiment. The upper stem portion 23 was the same "undersized" outer diameter stem in which multiple previous o-rings had suffered significant damage. A couple days are required to complete the 5000 cycles required for a reliable valve test. During testing, it was determined during the machining of the upper stem portion 23, tooling had slightly contacted the outer diameter of the upper stem portion 23, and that no subsequent measurement of the diameter had been taken. It was determined that if any continuing cycling problems occurred, that such diameter should be checked, since an undersize upper stem portion 23 could lead to severe o-ring 24 extrusion problems. Subsequently, the 5000 cycles were completed without a leak failure. Applicants removed the stem 21 from the valve 40 after the test, and observed that the o-ring 24 appeared generally the same as it had prior to testing. A beneficial discovery came when Applicants then measured the outer diameter of the upper stem portion 23, and found that it measured 0.200 inches, when it was specified to be 0.207 inches. This meant that the clearance between the outer diameter of the upper stem 23 and the valve nozzle bore 30 was 0.009 inches, assuming a 0.209 inch bore. This was a positive development, since based on previous experience, the maximum clearance that could be tolerated with a 90-durometer o-ring 24 was about 0.002 or 0.003 inches, without significant extrusion and early destruction of the o-ring. These results were unexpected. A condition had existed in the valve 40 that should have destroyed any o-ring 24 placed in it during cycle testing, yet the o-ring had virtually no degradation. This outstanding performance has been repeated each time the improved venting system has been tested since that first test.

The improved venting system thus ameliorates the two most detrimental failure mechanisms for an o-ring when it is used as a valve seat, namely extrusion and ballooning.

Figure 8:
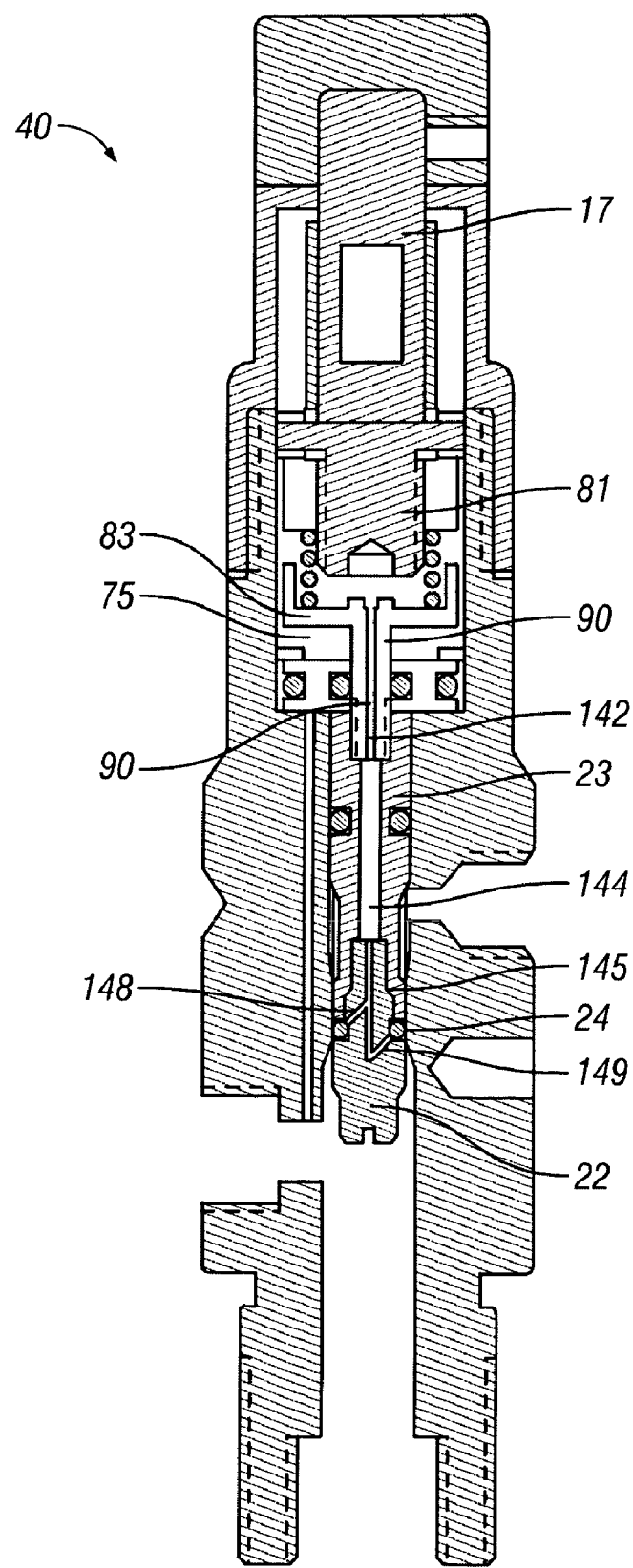
FIG. 8 is an axial (side) sectional view of an alternative embodiment of the valve-regulator apparatus according to the present invention, showing the inclusion of a valve seat venting system.
Figure 8A:
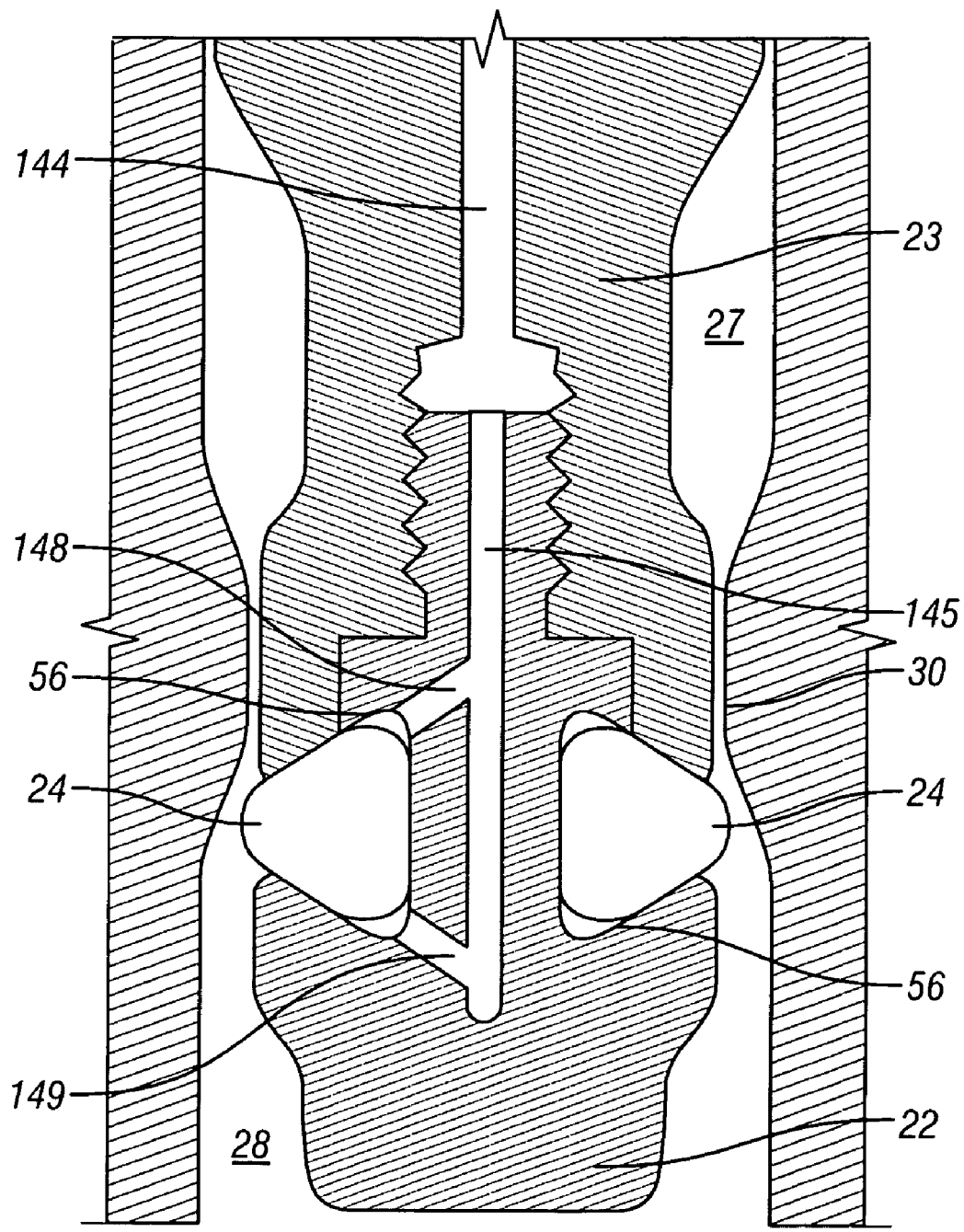
FIG. 8A is an enlarged axial (side) sectional view of the stem and nozzle portions of the apparatus shown in FIG. 8, depicting certain details of the seat venting system.
Figure 8B:
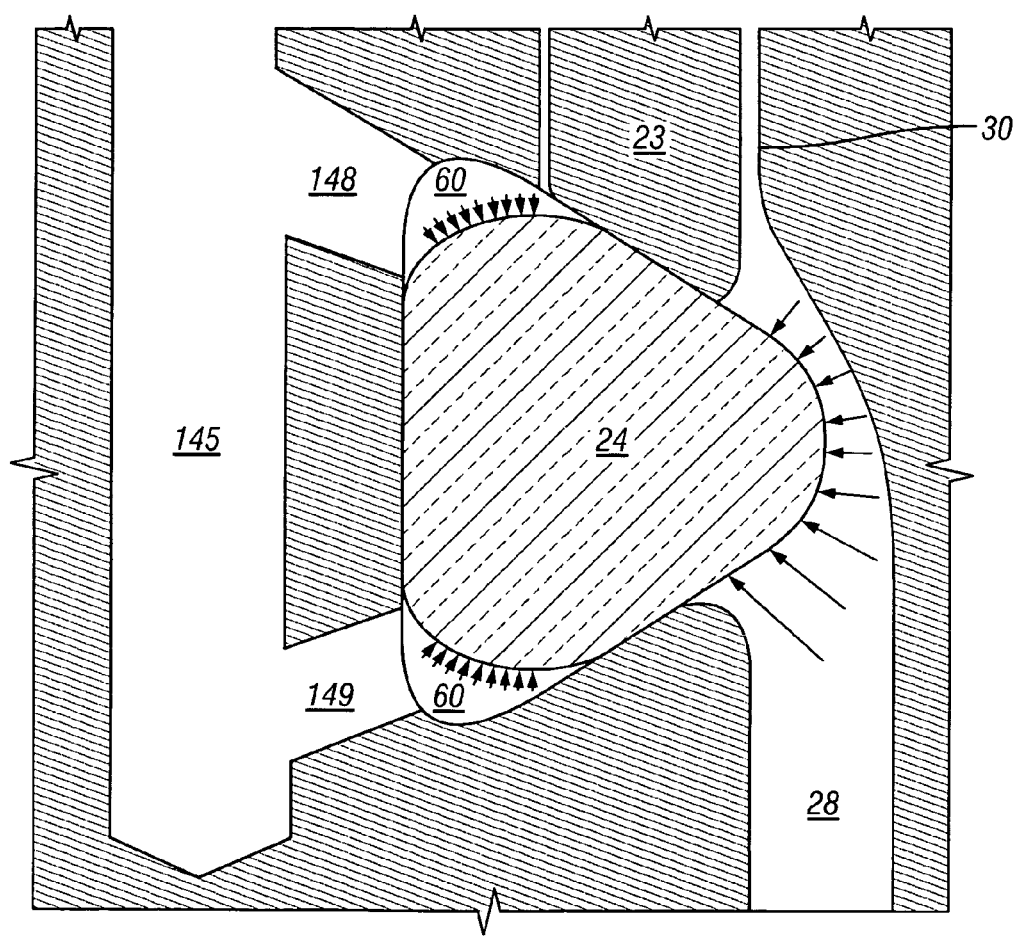
FIG. 8B is an enlarged axial (side) sectional view of the stem and nozzle elements seen in FIG. 8A, the double enlargement showing the situation of the o-ring within a pocket defined in the stem.

Combined reference is made to FIGS. 8, 8A, and 8B, depicting the improved seat venting embodiment of the invention. The improved venting permits the interior of the pocket 56 in the o-ring gland to be fully vented. FIG. 8 shows an alternative embodiment of the valve-regulator apparatus 40 featuring on version of an improved seat venting system. There is provided in the body 20 a first vent hole 140 that permits pressure in the interstage chamber 75 to obtain equilibrium with ambient pressures. A central vent duct 142 is provided axially through the length of the extension shaft 90. When the system is fully assembled as seen in FIG. 8, the extension shaft's vent duct 142 is in registration with a corresponding axial vent duct 144 in the proximate stem portion 23, when the shaft 90 is screwed or otherwise secured into the proximate stem portion. Thus, there is fluid communication between proximate stem duct 144 and the shaft's vent duct 142, the latter being in fluid communication with the interstage chamber 75, which is itself vented by hole 140.

The lower or distal stem portion 22 likewise features a central axially configured lower vent duct 145. The lower vent duct 145 does not run the entire length of the distal stem portion 22. Rather, there are defined within the interior of the distal stem portion 22 one or more lateral ramifications leading to the pocket 56 in which the o-ring 24 is disposed. These radially extending branch ducts 148, 149 provide for the interior venting of the seat to ameliorate extrusion or ballooning of the o-ring 24 seat.

FIG. 8A is an enlarged view of the lower portion of the stem 21 depicted in FIG. 8. It is seen that gas may obtain the interior of the seat pocket 56 via the branch ducts 148, 149. FIG. 8A depicts by way of example an upper branch duct 148 that is radially aligned with a lower branch duct 149 directly below it. Nevertheless, it will be immediately understood by one skilled in the art that since the pocket 56 defined in the stem 22 is generally annular, having the three-dimensional shape of a torus, any number of branch ducts 148, 149 may be provided, extending radially between the lower vent duct 145 and the gland pocket 56. The angled branch ducts 148, 149 preferably open into the bottom corners of the pocket or gland 56 and preferably are aligned longitudinally on the same side of the gland; such an arrangement provides a means for preventing the o-ring 24 from "naturally activating" and selectively closing off either of the two branch ducts 148 or 149by deforming in two opposite directions at one. Hence, the o-ring is unable to simultaneously extend into both the upper and lower voids 60 and cover the duct opening at those locations. and that such branch ducts need not be radially aligned. Rather, two or more ducts 148, 149 may be radially offset from one another (i.e., when viewed axially from above or below) in a spoke-like fashion. It also will be understood that the simplest embodiment features a single branch duct leading from lower vent duct 145 to the pocket 56.

Accordingly a gas may be provided to or from the void 60 in the pocket 56 between o-ring 24 and stem 22. The stabilizing venting flow occurs through the branch ducts 148, 149 to or from the lower vent duct 145; likewise gas may flow to or from the lower vent duct 145 via the upper vent duct 144 in axial registration therewith.

The advantage of the invention is apparent with reference to FIG. 8B. Dynamic pressures cause in rapid gas flow to or from the lower chamber 28 via the bore nozzle 30. The flow results in forces upon the o-ring 24, indicated by the large directional arrows in FIG. 8B, which in the absence of venting can cause o-ring extrusion and ballooning. However, equilibrating forces, indicated by the many small directional arrows in FIG. 8B, are cause by the venting of gas into the void 60 via the branch ducts 148, 149, which are in fluid communication with the lower stem duct 145. The resultant force vectors stabilize the o-ring 24within the pocket 56. The stabilized o-ring 24 remains in three-point sealed contact as shown, there being two annuli of contact between the o-ring and the distal stem portion 22, and one annulus of contact between the o-ring and the proximate stem portion 23. The o-ring extrusion is eliminated, and the o-ring 24 remains in proper position for eventual (and repeated) sealing contact with the nozzle 30 of the body 20, with minimal wear.

The venting system eliminates the potential for ballooning and makes the valve 40 tolerant of normal manufacturing tolerances. The upper stem portion 23 vents above the stem seal if pressure gets "under" the o-ring seal. By venting the inside voids of the gland or pocket, the lower stem portion 22 provides a low-pressure region on both the upper and lower sides of the o-ring itself. The interior void regions 60 are normally sealed but if pressure does start to develop under the o-ring 24, it is vented and the o-ring is pressed or "locked" in the gland.

The use of a vented, stabilized o-ring also improves the latitude for turns to first flow for the handle 17. Because the magnitude of the "squeeze" on the o-ring 24 is no longer critical, the precise seat location where the o-ring 24 must the nozzle 30 is not so fixed, longitudinally, permitting flexibility in the number of turns to "full open" on the regulator.

Accordingly, the o-ring creates a seal at the bottom center of the gland or pocket 56, and simultaneously at both the beveled sides of the pocket as well. The pressure gradient across the top surface of the o-ring 24 is shown using directional arrows of differing length to indicate higher pressure with long arrows, and shorter arrows for lower pressure. The extremely low pressure at the bottom sides of the o-ring 24 are illustrated using very short arrows. The pressure differential over the top void 60, versus that in the bottom corner of the gland or pocket, is a mechanism that keeps the o-ring 24 tucked into the pocket 56.

It is observed that a gas system could utilize vacuum to control the o-ring seat by providing a relative vacuum in the vent ducts 144, 145, instead of the approximate 14.0 psi (atmospheric) pressure of the embodiment shown in the figures, which are vented to the valve exterior.

Figure 9:
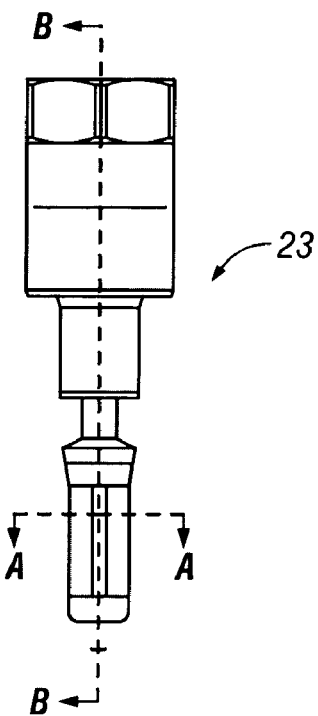
FIG. 9 is a side view of a proximate or upper stem component according to one embodiment of the apparatus of FIG. 8.

FIGS. 9, 9A–9D and FIGS. 10, 10A and 10B illustrate a variant in the seat venting system, similar in most respects to the embodiment of FIGS. 8, 8A and 8B. These figures provide additional and more precise insight into the detail of the venting system according to the invention. FIG. 9 is a side view of a proximate stem portion 23 according to one embodiment of the invention. As with previous embodiments, the upper part of the distal stem 22 is insertable into a corresponding socket in the lower reach of the proximate stem portion 23. The exterior of the upper segment of the distal stem portion 22 preferably is threaded for screwed engagement into the proximate stem 23. The distal and proximate stem portions 22, 23 used in the seat venting system are configured generally like the corresponding stem portions of other embodiments, are located in substantially the same place in the apparatus 40, and fill generally the same functions.

Figure 9A:
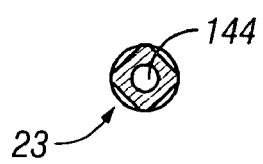
FIG. 9A is an axial (end) sectional view of the component depicted in FIG. 9, taken along section line A—A in FIG. 9.
Figure 9B:
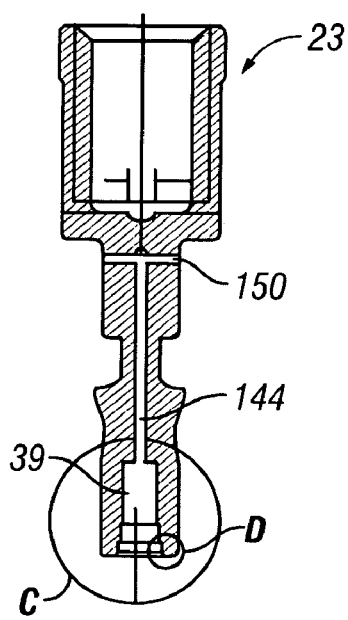
FIG. 9B is an axial (side) sectional view of the component depicted in FIG. 9, taken along section line B—B in FIG. 9.
Figure 9C:
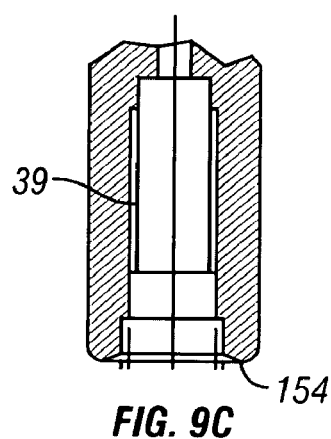
FIG. 9C is an enlarged side sectional view of the portion of the component designated in FIG. 9B.
Figure 9D:
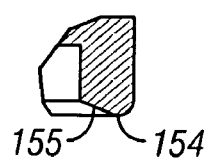
FIG. 9D is a greatly enlarged side sectional view of the portion of the component designated in FIG. 9B.

The improvement is the provision of the axial, central, upper stem vent duct 144 seen in FIG. 9A. FIG. 9B, a longitudinal sectional view of proximate stem 23, shows that a lateral duct 150 intersects with the proximate end of the upper vent duct 144 to provide fluid communication between the distal terminus of the upper stem 23 and the exterior of the upper segment of the upper stem. Lateral duct 150 may be a single bore diametrically across the stem 23. The invagination or socket 39 shown in enlarged cross section n FIG. 9C is interiorly threaded to receive the correspondingly threaded exterior of the upper segment 157 of the distal stem portion 22 seen in FIGS. 10, 10A, and 10B. As depicted by FIG. 9D, the distal terminus 154 of the upper stem portion 23 is rounded, and the rim defining the orifice of the socket 39 has a gentle chamfer 155. The rounded terminus 154 and chamfer 155 provide for a gentle contact with the o-ring 24, and help define the pocket in which the o-ring is secured, as best seen in FIG. 8B, when the stem portions 22, 23 are interconnected. Deleterious pressure gradients across the o-ring 24 are minimized by the ability of air to flow to the inside of the o-ring seat via the lateral duct 150 and the upper axial vent 144.

Figure 10:
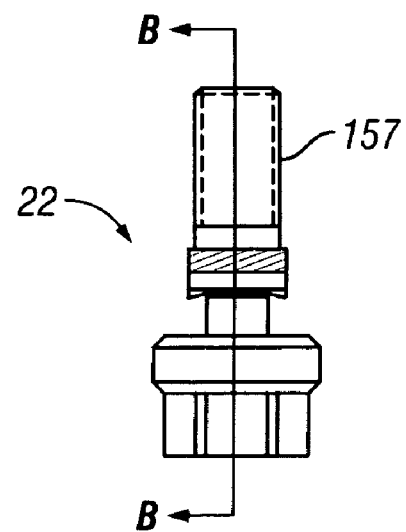
FIG. 10 is a side view of a distal or lower stem component according to one embodiment of the apparatus of FIG. 8.
Figure 10A:
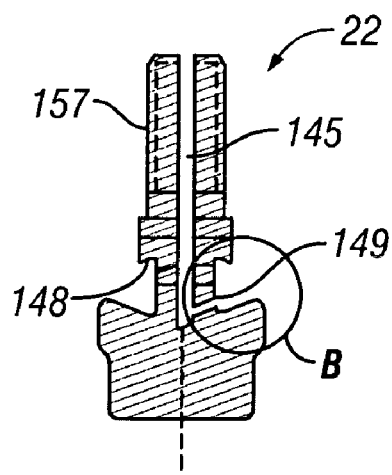
FIG. 10A is an axial (side) sectional view of the component depicted in FIG. 10, taken along section line A—A in FIG. 10.
Figure 10B:
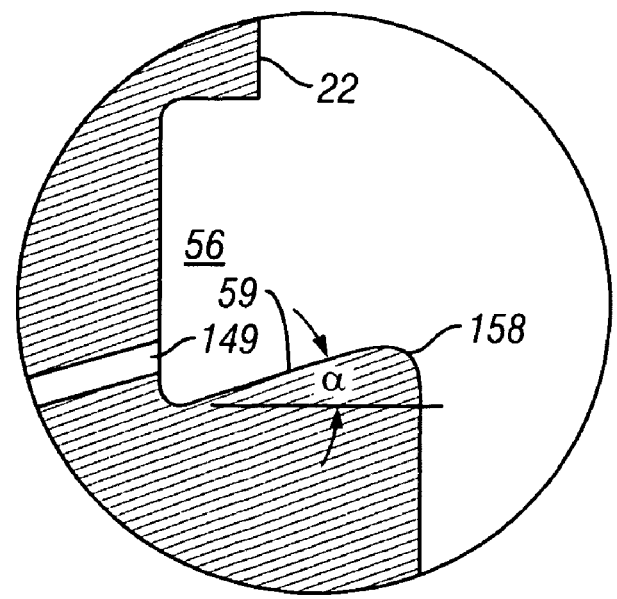
FIG. 10B is an enlarged side sectional view of the portion of the component designated in FIG. 10A.

FIG. 10 shows the distal stem portion 22, which has its upper segment 157 exteriorly threaded for screwed engagement into the socket 39 of the upper stem 23. The improvement also includes the provision of the axial, central, lower stem vent duct 145 seen in FIG. 10B. FIG. 10B, a longitudinal sectional view of distal stem 22, shows a pair of branch ducts 148, 149 intersecting the lower vent duct 145 to provide fluid communication between the proximal terminus of the lower stem 22 and the interior of the o-ring pocket 56. Lateral branch ducts 148, 149 are one or more radially drilled tubes, and may be provided at inclined angles in relation to the axis as seen in FIG. 10B. As depicted by FIG. 10C, the ledge 59 of the pocket in the lower stem portion 22 has a rounded outside rim 158, and is dispose at an angle α of approximately 20°. The rounded terminus 158 provides for a gentle insertion and contact of the o-ring 24, and helps define the pocket in which the o-ring is secured. Deleterious pressure gradients across the o-ring 24 are minimized by the ability of air to flow to the inside of the o-ring seat via the branch ducts 148, 149 and the lower axial vent 145.

Some of the features of the improved seat venting configuration are as follows:

1. An o-ring when used as a valve seat is not restrained on its outer diameter except when the valve is fully closed.

2. An o-ring when used as a valve seat undergoes dynamic gas pressure variations across the o-ring that cause the pressure to be higher or lower, either upstream or downstream of the o-ring, depending on whether you are filling the attached cylinder, or extracting gas from the cylinder.

3. An o-ring when used as a valve seat and exposed to the associated dynamic gas pressure variations is subject to having the gas pressure creep under the o-ring (probably entering from the high pressure side), and to therefore develop forces which try to expand the o-ring up and out of the gland in the direction of the unconstrained o-ring outer diameter. This action is referred to as o-ring ballooning or blooming.

4. An o-ring when used as a valve seat that balloons causes a portion of the o-ring to be unconstrained and to protrude outside the gland. This may occur on one side in a lop-sided eccentric manner, or it may be relatively concentric. This condition, once it develops, can be irreversible, especially in the lop-sided eccentric variation. In either case when the valve next cycles closed, the protruding unconstrained portion of the o-ring is subject to being either jammed into the entrance nozzle portion of the valve seat of the valve body and sheared, or to be sucked into a diametrically large place in the entrance nozzle portion of the valve body by the pressure differential self actuation feature of the o-ring, and thereby be subject to o-ring extrusion. Either of these two mechanisms is severely detrimental to the o-ring and lead to early leakage failure, and to destruction of the o-ring. It is therefore paramount that the o-ring be constrained within its gland throughout the life of the valve. This was accomplished by using the radius cornered wedge-shaped set squeeze mechanical o-ring gland in the earlier disclosure with good success. However the performance of the new venting system is far superior.

5. To control o-ring ballooning and extrusion, based on the above observations, it is concluded that it is necessary to keep the o-ring tucked down inside the gland and allow only a small portion of the o-ring to extend diametrically outside the gland for performing its valve seat closing function.

6. The means incorporated in the new venting system to cause this to happen was the creation of a configuration that would cause there to always be low pressure at, and circumferentially around both of the inside corners inside the o-ring gland under the o-ring, at all times, regardless of the position of the valve, open or closed, under pressure or not under pressure. And most importantly, when the valve was pressurized the gas pressure would aid in the process of keeping the o-ring tucked down into the gland by the force developed from that gas pressure pushing the o-ring down into the gland and keeping it there. Hence, applicants now had favorable physics assisting the new venting system in assuring low stress long life of the o-ring and the valve. Test results indicate just how well this has worked out.

7. The configuration that is used in the new venting system incorporates a series of interconnected small drill holes that lead from both inside corners of the bottom of the o-ring gland to the exterior of the valve body. This then ensures that atmospheric pressure is maintained at each point throughout the interconnected series of small drill holes, including the point where they enter the two bottom corners of the o-ring gland. It is important to note that the drill holes are small, and that they are positioned in the extreme corners of the bottom of the o-ring gland. This positioning accomplishes two important goals. Namely on the one hand it allows the o-ring to maintain a seal at the bottom center of the gland, and at both of the wedge shaped beveled sides of the o-ring gland, while on the other hand, keeping the o-ring from closing off either of the two small drilled holes through o-ring self activation processes, which could then defeat or partially defeat their purpose and function.

8. It is also noted that the o-ring would have difficulty in deforming sufficiently to extend out into the outside bottom corners of the wedge shaped gland, and therefore not be able to prevent the creation of two low pressure rings of space that extend 360 degrees circumferentially around underneath both the upstream and the downstream sides of the o-ring. This then results in the o-ring having rings of low pressure underneath both of its sides inside the gland, and high pressure over its entire outer diameter. Hence the o-ring has nowhere to go but to stay tucked into the gland and to do its job.

9. The new venting configuration can be readily adapted to use in the valve regulator, by simply providing a similar series of small drilled passages from the seat o-ring gland up to the top portion of the valve regulator body where there is a vent hole to the exterior of the body.

In view of the outstanding performance of the valve seat in the test using the improved o-ring seat venting system, many new tradeoffs are potentially now available which were not available previously, including looser tolerances and lower durometer o-rings 24. This may offer a reduction in manufacturing/production costs, while also adding some additional manufacturing complexity and associated costs. Nevertheless, the new venting system provides assurance of highly reliable and safe performance of the o-ring 24 seat in its ability to resist the two failure mechanisms that have been most prevalent during the valve seat of the invention, namely extrusion and blooming.

The provision of cross-drilled holes to provide the lateral and branch venting ducts 148, 149, 150 of the embodiments of FIGS. 8, 9 and 10 may add undesirable cost to manufacture the stem 21. Also, it may be difficult to hold the longitudinal tolerances necessary to provide the o-ring 24 with the proper squeeze when the stem 21 is fully assembled.

To address these problems, an alternative configuration for the o-ring venting system is provided. The improvement features a generally cylindrical internal piece, which is threaded on either side of a location thereon where the inside diameter of the o-ring 24 rests when the valve is fully assembled. The internal piece has non-threaded cylindrical extensions on either or both ends, which project axially beyond the threaded portions of the piece. One of the purposes of these extensions is to accommodate "staking" the internal piece in place after threading it into either the proximate stem portion 23 (alternatively the distal stem portion 22).

Figure 11B:
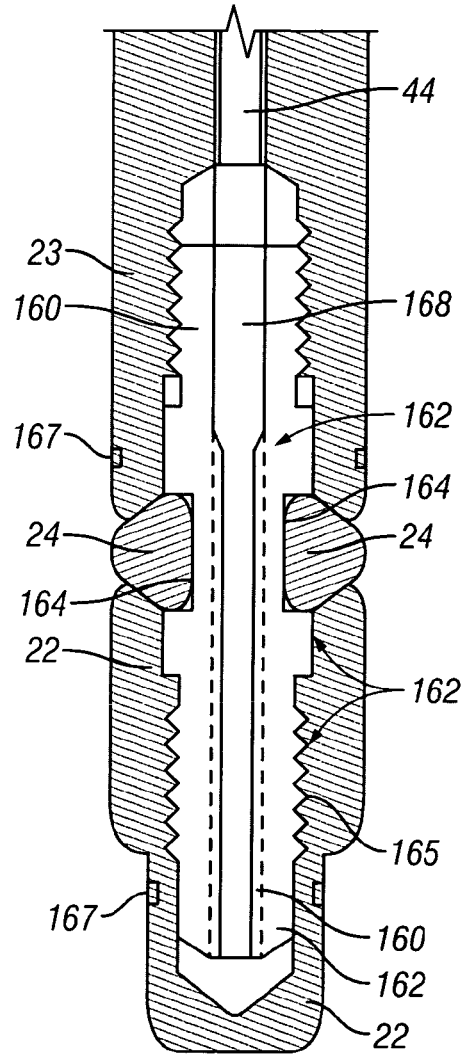
FIG. 11B is an enlarged axial (side) sectional view of a stem component of the apparatus of an alternative embodiment of the invention, showing the disposition of the grooved internal element shown in FIG. 11A within the stem of a valve-regulator as shown in FIG. 8.
Figure 11A:
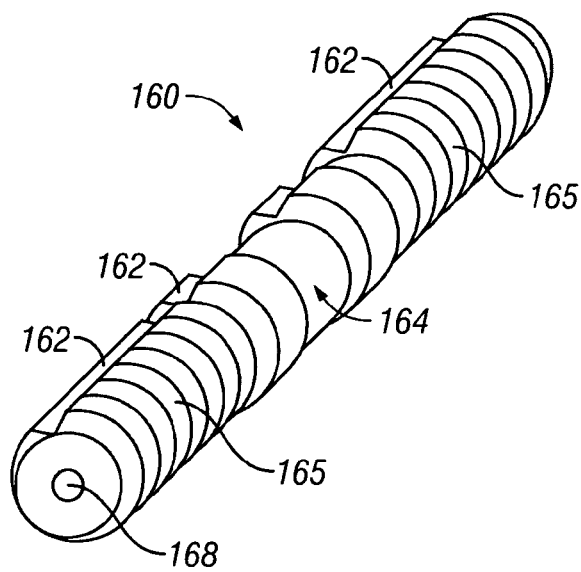
FIG. 11A is an enlarged perspective view of a grooved internal element useable in an alternative configuration of the seat venting system according to one embodiment of the apparatus of the invention.
Figure 11C:
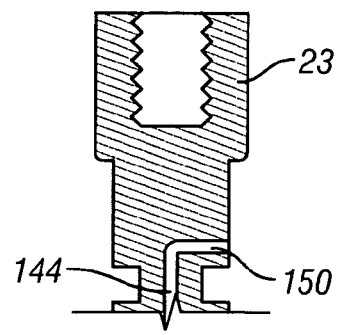
FIG. 11C is an enlarged axial (side) sectional view of the upper or proximate stem component useable with the grooved internal element seen in FIGS. 11A and 11B.

The improvement comprising the grooved and threaded internal piece 160 is depicted in FIGS. 11A-11C. The internal piece 160 has a groove 162 or other similar feature, which allows venting along the entire length of the internal piece 160, or at least along both ends of the internal piece up to the location 164 where the internal diameter of the o-ring 24 rests when the stem 21 is assembled. This groove 162 can pass "under" (i.e. radially inside) the o-ring 24 and accommodate vent communication between both the lower corners of the o-ring internal diameter resting area 164 of the internal piece 160. At assembly, the lower end of the internal piece 160 is threaded into the distal stem portion 22 until the o-ring seat area 164 of the internal piece is properly situated relative to the stem portion 22. The internal piece 160 features an axial longitudinal vent 168 which can be brought into registration with the upper vent duct 144 (FIG. 11C) in the proximate stem 23 as with previously disclosed embodiments.

The internal piece 160 may then be staked (by stakes 167) or otherwise secured in place. The o-ring 24 is then disposed onto and around the internal piece, and slipped into position so that the internal diameter of the toroidal o-ring is adjacent the o-ring area 164 of the internal piece 160. Installation of the o-ring 24 upon the internal piece 160 may include lubricating the o-ring with a compatible lubricant, and passing the o-ring over the threads 165 of the internal piece using a protective thimble.

The upper end of the internal piece 160 is then screwed into the proximate stem portion 23 until the proper squeeze is obtained on the o-ring 24. The stem 21 and internal piece 160 are then staked or otherwise secured in place. This staking can be accomplished by monitoring the o-ring 24 outside diameter, which could include using a specific torque prior to staking. An unthreaded cylindrical extension on one end of the internal component 160 may be provided for staking the piece 160 in place after threading it into the upper and lower stem portions 23, 22.

This alternative venting system eliminates the need for any lateral or cross-drilled venting holes. This improvement also eliminates the apparatus' dependence on close longitudinal (axial) tolerances. Nevertheless, all the advantages of the venting system of the current design are retained, including that both sides of the internal diameter—effectively all sides—of the o-ring seat 24 are vented. The internal piece is a simple screw machine type part with one or more longitudinal grooves, which promotes high-speed, reduced costs, production.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for regulating the flow of a gas between a high-pressure zone and a zone of lower pressure, said apparatus comprising:
    a hollow body having an axis;
    a first chamber and a second chamber, said chambers defined within said body;
    a nozzle within said body and separating said chambers, said nozzle defining a passage for the passage of gas between said chambers; and
    a stem movable axially within said passage, extending at least partially into said first chamber, wherein axial movement of said stem varies the position of said stem in relation to said nozzle, said stem comprising:
        an o-ring seat disposed in an annular pocket on said stem and contactable with said nozzle to seal said passage against the passage of gas;
        a distal stem portion extending at least partially into said first chamber and a proximate stem portion within said second chamber and extending into said passage, said distal stem portion connectable to said proximate stem portion to squeeze at least part of said o-ring there-between; and
        an axial duct defined in said stem for venting said gas into an interior portion of said pocket;
    wherein said axial duct comprises a central duct in said proximate stem portion in linear registration, and fluid communication, with a central duct in said distal stem portion.

2. An apparatus according to claim 1 further comprising at least one branch duct defined in said distal stem portion, said at least one branch duct extending generally radially between said central duct in said distal stem portion and said interior portion of said pocket, wherein said gas flows through said at least one branch duct for balancing pressures between said pocket and said second chamber.

3. An apparatus according to claim 1 wherein when connected, said distal stem portion and said proximate stem portion define at least a portion of said annular pocket for receiving said o-ring.

4. An apparatus according to claim 1 further comprising an internal component insertable into said distal stem portion and said proximate stem portion for joining said stem portions together, said internal component comprising:
    a longitudinal central duct along the length of said internal component;
    an exterior seat portion for receiving thereon said o-ring;
    an external groove in fluid communication with said longitudinal central duct and with said exterior seat portion, wherein said gas flows along said groove for balancing pressures between said pocket and said second chamber.

5. An apparatus for regulating the flow of a gas between a high-pressure zone and a zone of lower pressure, said apparatus comprising:
    a hollow body having an axis;
    a first chamber and a second chamber defined within said body;
    a nozzle within said body and separating said chambers, said nozzle defining a passage for the passage of gas between said chambers; and
    a stem movable axially within said passage and comprising:
        a distal portion extending at least partially into said first chamber;
        a proximate portion at least partially within said second chamber and extending into said passage, wherein axial movement of said stem varies the position of said proximate portion in relation to said nozzle;
        an o-ring seat disposed in a pocket defined in said stem and contactable with said nozzle to seal said passage against the passage of gas; and
        vent means for balancing pressures between said pocket and said second chamber only, said vent means comprising a single axial duct defined in said stem between said second chamber and an interior portion of said pocket.

6. An apparatus according to claim 5, wherein said distal stem portion extends at least partially into said first chamber and said proximate stem portion is movable within said second chamber and extends into said passage, said distal stem portion connectable to said proximate stem portion to squeeze at least part of said o-ring in said pocket.

7. An apparatus according to claim 6 wherein said axial duct comprises a central duct in said proximate stem portion in linear registration, and fluid communication, with a central duct in said distal stem portion.

8. An apparatus according to claim 7 further comprising at least one branch duct defined in said distal stem portion, said at least one branch duct extending generally radially between said central duct in said distal stem portion and said interior portion of said pocket, wherein said gas flows through said at least one branch duct for balancing pressures between said pocket and said second chamber.

9. An apparatus for regulating the flow of a gas between a high-pressure zone and a zone of lower pressure, said apparatus comprising:
   a hollow body having an axis;
   a first chamber and a second chamber, said chambers defined within said body;
   a nozzle within said body and separating said chambers, said nozzle comprising a convexly curved wall, and defining a passage for the passage of gas between said chambers; and
   a stem movable axially within said passage and comprising:
      a distal portion extending at least partially into said first chamber;
      a proximate portion within said second chamber and extending into said passage, wherein axial movement of said stem varies the position of said proximate portion in relation to said nozzle; and
      an o-ring seat in a pocket between said proximate portion and said distal portion of said stem and contactable with said nozzle to seal said passage against the passage of gas; and
      an axial duct for balancing pressures between an interior of said pocket and said second chamber;
wherein said pocket interior is substantially isolated from said first chamber.

* * * * *